US009556382B2

(12) United States Patent
Goetz et al.

(10) Patent No.: US 9,556,382 B2
(45) Date of Patent: Jan. 31, 2017

(54) POLYMERISABLE MIXTURES AND THE USE THEREOF IN LIQUID CRYSTAL DISPLAYS

(75) Inventors: Achim Goetz, Alsbach-Haehnlein (DE); Sven Christian Laut, Griesheim (DE); Andreas Taugerbeck, Darmstadt (DE)

(73) Assignee: Merck Patent GmbH, Dermstadt (DE)

( * ) Notice: Subject to any disclaimer, the term of this patent is extended or adjusted under 35 U.S.C. 154(b) by 110 days.

(21) Appl. No.: 13/810,769

(22) PCT Filed: Jun. 30, 2011

(86) PCT No.: PCT/EP2011/003240
§ 371 (c)(1),
(2), (4) Date: Jan. 17, 2013

(87) PCT Pub. No.: WO2012/022391
PCT Pub. Date: Feb. 23, 2012

(65) Prior Publication Data
US 2013/0114010 A1    May 9, 2013

(30) Foreign Application Priority Data
Jul. 21, 2010 (DE) .................. 10 2010 031 748

(51) Int. Cl.
| | | |
|---|---|---|
| *C09K 19/12* | (2006.01) | |
| *C09K 19/32* | (2006.01) | |
| *C09K 19/34* | (2006.01) | |
| *C09K 19/46* | (2006.01) | |
| *G02F 1/1333* | (2006.01) | |
| *C09K 19/38* | (2006.01) | |
| *C08F 220/30* | (2006.01) | |
| *C08F 222/10* | (2006.01) | |
| *C09K 19/54* | (2006.01) | |
| *C09K 19/04* | (2006.01) | |

(52) U.S. Cl.
CPC ......... *C09K 19/3809* (2013.01); *C08F 220/30* (2013.01); *C08F 222/1006* (2013.01); *C09K 19/12* (2013.01); *C09K 19/32* (2013.01); *C09K 19/3402* (2013.01); *C09K 19/46* (2013.01); *G02F 1/1333* (2013.01); *G02F 1/133365* (2013.01); *C08J 2300/206* (2013.01); *C09K 19/542* (2013.01); *C09K 2019/0448* (2013.01); *C09K 2019/123* (2013.01); *C09K 2019/3425* (2013.01)

(58) Field of Classification Search
CPC .................. C09K 2019/0448; C09K 2019/301; C09K 2019/3016; C09K 2019/122; C09K 2019/123; C09K 2019/323; C09K 2019/328; C09K 2019/3425; C09K 2019/548; G02F 1/133703
USPC ............ 252/299.61, 299.62, 299.63, 299.66, 252/299.67, 299.5; 428/1.1; 349/183
See application file for complete search history.

(56) References Cited

U.S. PATENT DOCUMENTS

| | | | |
|---|---|---|---|
| 5,154,994 A | 10/1992 | Yamagishi et al. | |
| 5,342,544 A | 8/1994 | Naito et al. | |
| 6,168,839 B1 | 1/2001 | Fujita et al. | |
| 7,981,320 B2 | 7/2011 | Irisawa et al. | |
| 8,585,925 B2 * | 11/2013 | Czanta ................... | C09K 19/42 252/299.01 |
| 8,940,184 B2 * | 1/2015 | Taugerbeck ....... | C09K 19/0403 252/299.6 |
| 9,090,822 B2 * | 7/2015 | Goetz .................... | C09K 19/12 |
| 9,096,795 B2 * | 8/2015 | Taugerbeck ........... | C09K 19/32 |
| 2001/0016238 A1 * | 8/2001 | Coates ................... | C09K 19/12 428/1.1 |
| 2006/0222783 A1 * | 10/2006 | Hayashi et al. ............... | 428/1.1 |
| 2007/0298191 A1 * | 12/2007 | Yamahara et al. ............. | 428/1.1 |
| 2009/0109392 A1 * | 4/2009 | Hsieh et al. ................... | 349/183 |
| 2009/0283937 A1 | 11/2009 | Kodama et al. | |
| 2009/0294730 A1 | 12/2009 | Irisawa et al. | |
| 2010/0149446 A1 * | 6/2010 | Fujisawa et al. ............... | 349/38 |

FOREIGN PATENT DOCUMENTS

| | | |
|---|---|---|
| DE | 102009011652 A1 | 10/2009 |
| JP | H05-132671 A | 5/1993 |
| JP | 05-264980 A | 10/1993 |
| JP | 2007169363 A | 7/2007 |
| JP | 2008019290 A | 1/2008 |
| JP | 2008239873 A | 10/2008 |
| WO | 98/27048 A1 | 6/1998 |

OTHER PUBLICATIONS

International Search Report from PCT/EP2011/003240 mailed on Jun. 6, 2012.
Office Action related to corresponding Japanese Patent Application No. 2013-519985 dated Dec. 25, 2014.
Office Action for related to corresponding Japanese Patent Application No. 2012-555317 dated Mar. 10, 2015.
Office Action for corresponding Taiwanese Patent Application No. 100125675 dated Jul. 31, 2015.

* cited by examiner

*Primary Examiner* — Shean C Wu
(74) *Attorney, Agent, or Firm* — Millen White Zelano & Branigan, P.C.

(57) ABSTRACT

The present invention relates to polymerizable mixtures and to the use thereof for optical, electro-optical and electronic purposes, in particular in liquid-crystal (LC) media and LC displays, especially in LC displays of the PS ("polymer sustained") or PSA ("polymer sustained alignment") type.

17 Claims, No Drawings

POLYMERISABLE MIXTURES AND THE USE THEREOF IN LIQUID CRYSTAL DISPLAYS

The present invention relates to polymerisable mixtures and to the use thereof for optical, electro-optical and electronic purposes, in particular in liquid-crystal (LC) media and LC displays, especially in LC displays of the PS ("polymer sustained") or PSA ("polymer sustained alignment") type.

The liquid-crystal displays (LC displays) used at present are usually those of the TN ("twisted nematic") type. However, these have the disadvantage of a strong viewing-angle dependence of the contrast. In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes a realignment of the LC molecules in the layer plane.

Furthermore, so-called FFS ("fringe-field switching") displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of an electrode which is structured in a comb-shaped manner, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light.

A further development of MVA uses protrusions on only one electrode side, while the opposite electrode has slits, which improves the transparency to light. The slotted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times.

In so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are the so-called PS (polymer sustained) or PSA (polymer sustained alignment) displays, for which the term "polymer stabilised" is also occasionally used. In these displays, a small amount (for example 0.3% by weight, typically <1% by weight) of one or more polymerisable compound(s) is added to the LC medium and, after introduction into the LC cell, is polymerised or cross-linked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable.

Unless indicated otherwise, the term "PSA" is used below as representative of PS displays and PSA displays.

In the meantime, the PS(A) principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a pretilt in the cell. In the case of PSA-OCB displays, for example, it is possible for the bend structure to be stabilised so that an offset voltage is unnecessary or can be reduced. In the case of PSA-VA displays, the pretilt has a positive effect on response times. For PSA-VA displays, a standard MVA or PVA pixel and electrode layout can be used. In addition, however, it is also possible, for example, to manage with only one structured electrode side and no protrusions, which significantly simplifies production and at the same time results in very good contrast at the same time as very good transparency to light.

In addition, so-called positive-VA displays have proven to be a particularly favourable embodiment. The initial alignment of the liquid crystals in the voltage-free starting state here, just as in the case of classical VA displays, is homeotropic, i.e. essentially perpendicular to the substrates. In contrast to classical VA displays, however, positive-VA displays use dielectrically positive LC media. By application of an electrical voltage to interdigital electrodes, which generate a field essentially parallel to the layer of the LC medium, the LC molecules are converted into an alignment which is essentially parallel to the substrates. Interdigital electrodes of this type are also usually used in IPS displays. Corresponding polymer stabilisation (PSA) has also proven to be advantageous in the case of positive VA displays, enabling a considerable reduction to be achieved in the response times.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, where both methods are known from the prior art.

In particular for monitor and especially TV applications, optimisation of the response times, but also of the contrast and luminance (thus also transmission) of the LC display continues to be demanded. The PSA method can provide crucial advantages here. In particular in the case of PSA-VA, PSA-IPS, PSA-FFS and PSA-positive-VA displays, a shortening of the response times, which correlate with a measurable pretilt in test cells, can be achieved without significant adverse effects on other parameters.

In the prior art, use is made, for example, of polymerisable compounds of the following formula:

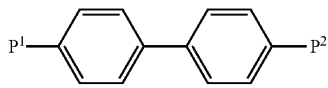

in which P denotes a polymerisable group, usually an acrylate or methacrylate group, as described, for example, in U.S. Pat. No. 7,169,449.

However, the problem arises that not all combinations consisting of LC mixture (also referred to as "LC host mixture" below)+polymerisable component (typically RMs) are suitable for PSA displays since, for example, an inadequate tilt or none at all becomes established or since, for example, the so-called "voltage holding ratio" (VHR or HR) is inadequate for TFT display applications. In addition, it has been found that, on use in PSA displays, the LC mixtures and RMs known from the prior art still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerisation by means of UV light without the addition of photoinitiators is desired, which may be advantageous for certain applications.

In addition, the selected combination of LC host mixture/RM should have the lowest possible rotational viscosity and the best possible electrical properties. In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a particularly small pretilt angle. Preferred materials here are those which produce a lower pretilt angle during polymerisation for the same exposure time than the materials known to date, and/or through the use of which the (higher) pretilt angle that can be achieved with known materials can already be achieved after a shorter exposure time. The production time ("tact time") of the display could thus be shortened and the costs of the production process reduced.

A further problem in the production of PSA displays is the presence or removal of residual amounts of unpolymerised RMs, in particular after the polymerisation step for production of the pretilt angle in the display. For example, unreacted RMs of this type may adversely affect the properties of the display by, for example, polymerising in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerised RMs is often observed in PSA displays. Uncontrolled polymerisation of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerisation of the RMs to proceed as completely as possible during production of the PSA display and for the presence of unpolymerised RMs in the display to be excluded as far as possible or reduced to a minimum. To this end, materials are required which enable highly effective and complete polymerisation. In addition, controlled reaction of these residual amounts would be desirable. This would be simpler if the RM polymerised more rapidly and effectively than the materials known to date.

There is thus still a great demand for PSA displays, in particular of the VA and OCB type, and LC media and polymerisable compounds for use in such displays, which do not exhibit the disadvantages described above or only do so to a small extent and have improved properties. In addition, there is a great demand for PSA displays, and materials for use in PSA displays, which have advantageous properties, in particular enable a high specific resistance at the same time as a large working-temperature range, short response times, even at low temperatures, and a low threshold voltage, a low pretilt angle, a multiplicity of grey shades, high contrast and a broad viewing angle, and have high values for the "voltage holding ratio" (VHR) after UV exposure. The LC mixtures should likewise not crystallise out and should have high low-temperature stability, also known as "LTS", i.e. the stability of the LC mixture to spontaneous crystallisation-out of individual components. To this end, the polymerisable compounds or RMs, in particular, should have adequately good solubility in the LC mixture.

The invention is based on the object of providing novel suitable materials, in particular RMs and LC media comprising same, for use in PSA displays, which do not have the disadvantages indicated above or do so to a reduced extent, polymerise as rapidly and completely as possible, enable a low pretilt angle to be established as quickly as possible, reduce or prevent the occurrence of "image sticking" in the display, and preferably at the same time enable very high specific resistance values, low threshold voltages and short response times. In addition, the LC media should have favourable LC phase properties and high VHR and LTS values.

A further object of the invention is the provision of novel RMs, in particular for optical, electro-optical and electronic applications, and of suitable processes and intermediates for the preparation thereof.

In particular, the invention is based on the object of providing polymerisable compounds which on the one hand produce a greater maximum pretilt after photopolymerisation, which results in the desired pretilt being achieved more quickly and thus in significantly shortened times for production of the LC display. On the other hand, however, the LC media and LC displays should also have further favourable properties, such as the highest possible VHR value.

This object has been achieved in accordance with the invention by the provision of materials, processes and LC displays as described in the present application. In particular, it has been found, surprisingly, that some or all of the objects described above can be achieved by using a polymerisable mixture which comprises at least two polymerisable compounds, where the first polymerisable compound acts as polymerisation initiator for the polymerisation of the second polymerisable compound, for the production of PSA displays. This means that the presence of the first polymerisable compound initiates and/or accelerates the polymerisation of the second polymerisable compound. This is achieved in accordance with the invention, for example, by selecting as the first polymerisable compound a compound which has higher reactivity under the same polymerisation conditions than the second polymerisable compound, for example a compound containing a larger number of polymerisable groups or containing polymerisable groups having higher reactivity than the second compound, and/or a compound whose polymerisation proceeds more quickly than the polymerisation of the second compound.

Surprisingly, it has been found that the use of a polymerisable mixture according to the invention, or the use of an LC medium comprising a polymerisable mixture of this type, in PSA displays and during the production thereof enables significant advantages to be achieved compared with the prior art.

Thus, on the one hand, the desired pretilt in PSA displays can be achieved more quickly with a polymerisable mixture according to the invention than on use of an LC medium which, for example, comprises only the second polymerisable compound. In addition, a higher VHR value can in many cases be achieved than on use of an LC medium which, for example, comprises only the first polymerisable compound. This has been demonstrated in conjunction with an LC medium by exposure time-dependent pretilt measurements in VA tilt measurement cells.

A further advantage of the mixture according to the invention is that the use of the first polymerisable compound, which acts as polymerisation initiator for the second polymerisable compound, enables the usual photoinitiators known from the prior art to be omitted entirely.

As described above, undesired image sticking may occur in the LC display, triggered, for example, by ionic or free-radical impurities from the LC medium, or by the presence of unpolymerised RMs. U.S. Pat. No. 6,781,665 describes that image sticking can also be caused by an excessively high content of polymerisation initiator in the LC medium. It is therefore proposed in U.S. Pat. No. 6,781,665 to reduce the amount of initiator in the LC medium or to omit the initiator entirely. However, this is "paid for" with the disadvantage of slower or also less complete polymerisation, meaning that the tilt angle is achieved more slowly and the amount of undesired, unpolymerised residual RMs may increase.

The use of a polymerisable mixture according to the invention in which the first polymerisable compound acts as polymerisation initiator for the second polymerisable compound enables conventional photoinitiators to be omitted entirely, while, however, the disadvantages described above, such as slow or incomplete polymerisation, can be avoided at the same time. In addition, the occurrence of fragments, which usually arise during the decomposition reaction of conventional polymerisation initiators and may contaminate the LC medium, is avoided.

In addition, the polymerisable mixtures according to the invention have high solubility in the LC media, facilitating LC media having high LTS values and a relatively low tendency towards crystallisation in the display.

However, these results were hitherto neither described in nor obvious from the prior art.

The invention thus relates to a polymerisable mixture comprising at least one first polymerisable compound and at least one second polymerisable compound, characterised in that the first polymerisable compound initiates and/or accelerates the polymerisation of the second polymerisable compound.

The invention furthermore relates to an LC medium comprising a polymerisable mixture according to the invention as described above and below.

The invention furthermore relates to the use of the polymerisable mixtures and LC media according to the invention in LC displays of the PS or PSA (polymer sustained alignment) type.

The invention furthermore relates to an LC medium comprising a polymerisable mixture according to the invention and one or more additional compounds, which may also be mesogenic, liquid-crystalline and/or polymerisable.

The invention furthermore relates to an LC medium comprising a polymer obtainable by polymerisation of the polymerisable mixture according to the invention and one or more additional compounds, which may also be mesogenic, liquid-crystalline and/or polymerisable.

The invention furthermore relates to an LC medium comprising
- a polymerisable component A) comprising a polymerisable mixture according to the invention, and
- a liquid-crystalline component B), also referred to below as "LC host mixture", comprising one or more, preferably two or more, low-molecular-weight (monomeric and unpolymerisable) compounds as described above and below.

The invention furthermore relates to a process for the preparation of an LC medium as described above and below in which one or more low-molecular-weight liquid-crystalline compounds, or an LC host mixture as described above and below, are mixed with a polymerisable mixture according to the invention and optionally with further additives and/or liquid-crystalline compounds.

The invention furthermore relates to the use of polymerisable mixtures according to the invention, and to the use of LC media according to the invention, in PS and PSA displays, in particular the use in PS and PSA displays containing an LC medium, for the production of a tilt angle in the LC medium by in-situ polymerisation of the polymerisable mixtures according to the invention in the PSA display, preferably with application of an electric or magnetic field.

The invention furthermore relates to an LC display containing a polymerisable mixture according to the invention or an LC medium according to the invention, in particular a PS or PSA display, particularly preferably a PSA-VA, PSA-OCB, PSA-IPS, PSA-FFS, PSA-positive-VA or PSA-TN display.

The invention furthermore relates to an LC display of the PS or PSA type containing an LC cell having two substrates and two electrodes, where at least one substrate is transparent to light and at least one substrate has one or two electrodes, and a layer, located between the substrates, of an LC medium comprising a polymerised component and a low-molecular-weight component, where the polymerised component is obtainable by polymerisation of a polymerisable mixture according to the invention between the substrates of the LC cell in the LC medium, preferably with application of an electrical voltage to the electrodes.

The invention furthermore relates to a process for the production of an LC display as described above and below in which an LC medium comprising one or more low-molecular-weight liquid-crystalline compounds or an LC host mixture as described above and below and a polymerisable mixture according to the invention is introduced into an LC cell having two substrates and two electrodes as described above and below, and the polymerisable mixture is polymerised, preferably with application of an electrical voltage to the electrodes.

The PS and PSA displays according to the invention have two electrodes, preferably in the form of transparent layers, which are applied to one or both of the substrates which form the LC cell. Either in each case one electrode is applied to each of the two substrates, as, for example, in PSA-VA, PSA-OCB or PSA-TN displays according to the invention, or both electrodes are applied to only one of the two substrates, while the other substrate has no electrode, as, for example, in PSA-IPS, PSA-positive-VA or PSA-FFS displays according to the invention.

The following meanings apply above and below:

The terms "tilt" and "tilt angle" relate to a tilted alignment of the LC molecules of an LC medium relative to the surfaces of the cell in an LC display (here preferably a PS or PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

The term "reactive mesogen" or "RM" denotes a compound containing one mesogenic group and one or more functional groups which are suitable for polymerisation (also referred to as polymerisable group or group P).

The terms "low-molecular-weight compound" and "unpolymerisable compound" denote compounds, usually monomeric, which contain no functional group which is suitable for polymerisation under the usual conditions known to the person skilled in the art, in particular under the conditions used for the polymerisation of RMs.

"Halogen" denotes F, Cl, Br or I.

The first polymerisable compound preferably contains a ring system containing one or more carbo- or heterocyclic radicals and one or more polymerisable radicals, which are connected to the ring system either via a spacer group or directly (i.e. not via a spacer group).

The second polymerisable compound preferably contains a ring system which is different from the first polymerisable compound, containing one or more carbo- or heterocyclic radicals and one or more polymerisable radicals, which are connected to the ring system either via a spacer group or directly (i.e. not via a spacer group).

In the first and second polymerisable compounds, the individual rings in the ring system may either be linked to one another directly or via bridging groups or fused to one another. The ring system preferably contains 6 to 30 C atoms.

The first polymerisable compound particularly preferably contains a divalent radical selected from the group consisting of the formulae A, B, C and D:

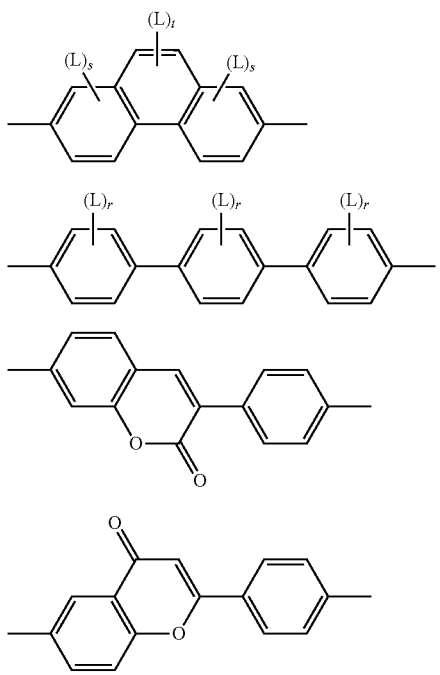

in which the individual radicals have the following meanings:

L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, r denotes 0, 1, 2, 3 or 4, s denotes 0, 1, 2 or 3, t denotes 0, 1 or 2.

Furthermore, besides the radical of the formula A, B, C or D, the first polymerisable compound preferably contains one or more, preferably two or more than two, polymerisable radicals, which are connected to the divalent radical of the formula A, B, C or D either via a spacer group or directly (i.e. not via a spacer group).

The invention furthermore relates to a polymerisable mixture comprising at least one first polymerisable compound and at least one second polymerisable compound, where the first polymerisable compound contains a radical selected from the group consisting of the formulae A, B, C and D, as described above and below.

The polymerisable radicals present in the first and second polymerisable compounds are preferably identical.

The polymerisable radicals present in the first and second polymerisable compounds are preferably selected from the group consisting of vinyloxy, acrylate, methacrylate, fluoroacrylate, chloroacrylate, oxetane and epoxide groups.

Apart from the first polymerisable compound, the polymerisable mixture according to the invention preferably comprises no polymerisation initiator (i.e. no additional polymerisation initiator for the polymerisation of the first and/or second polymerisable compound).

The first polymerisable compound is preferably selected from the group consisting of the following formulae:

in which L, r, s and t have the meanings indicated for formula A,

P on each occurrence, identically or differently, denotes a polymerisable group, Sp on each occurrence, identically or differently, denotes a spacer group or a single bond, R and $R^a$ each, independently of one another, denote P-Sp-, H, F, Cl, Br, I, —CN, —$NO_2$, —NCO, —NCS, —OCN, —SCN, $SF_5$, straight-chain or branched alkyl having 1 to 25 C atoms, in which, in addition, one or more non-adjacent $CH_2$ groups may each be replaced, independently of one another, by arylene, —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, or aryl or heteroaryl, preferably having 2 to 25 C atoms, which may also contain two or more fused rings and which is optionally mono- or polysubstituted by L', where at least one of the radicals R and $R^a$ in the formulae 1C and 1D denotes P-Sp-, L' on each occurrence, identically or differently, denotes P-Sp-, H, OH, $CH_2OH$, halogen, $SF_5$, $NO_2$, a carbon group or a hydrocarbon group, $R^0$, $R^{00}$ each, independently of one another and on each occurrence identically or differently, denote H or alkyl having 1 to 12 C atoms.

Particular preference is given to compounds of the formulae 1A and 1B in which R denotes P-Sp-.

Preference is furthermore given to compounds of the formulae 1C and 1D in which both radicals R and $R^a$ denote P-Sp-.

The second polymerisable compound is preferably selected from the group consisting of the following formulae:

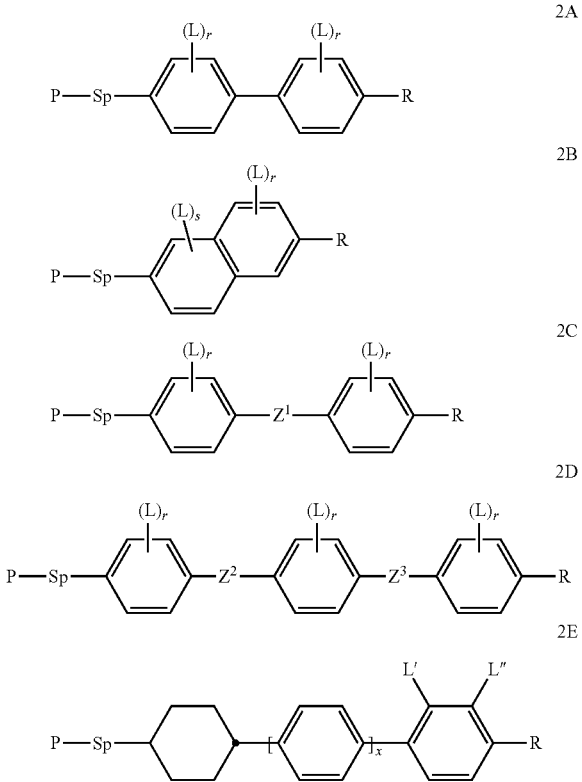

in which P, Sp, R, L and r have the meanings indicated for formula 1A,

Z$^1$ denotes —O—, —CO—, —CO—O—, —O—CO—, —C(R$^y$R$^z$)— or —CF$_2$CF$_2$—,

R$^y$ and R$^z$ each, independently of one another, denote H, F, CH$_3$ or CF$_3$, Z$^2$ and Z$^3$ each, independently of one another, denote —CO—O—, —O—CO—, —CH$_2$O—, —OCH$_2$—, —CF$_2$O—, —OCF$_2$—, or —(CH$_2$)$_n$—, where n is 2, 3 or 4, L' and L" each, independently of one another, denote H, F or Cl, and x denotes 0 or 1.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of CH$_2$=CW$^1$—CO—O—, CH$_2$=CW$^1$—CO—,

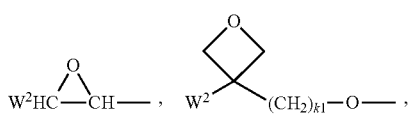

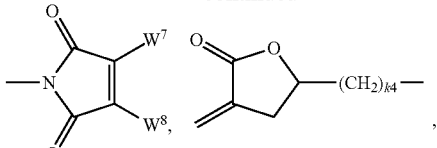

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Particularly preferred groups P are selected from the group consisting of CH$_2$=CW$^1$—CO—O—, CH$_2$=CW$^1$—CO—,

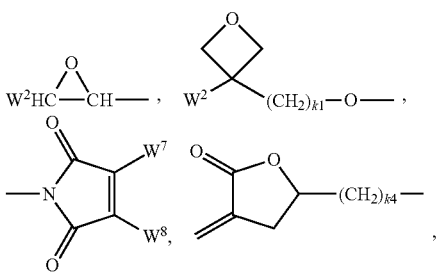

CH$_2$=CW$^2$—O—, CW$^1$=CH—CO—(O)$_{k3}$—, CW$^1$=CH—CO—NH—, CH$_2$=CW$^1$—CO—NH—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, k$_1$, k$_2$ and k$_3$ each, independently of one another, denote 0 or 1, k$_3$ preferably denotes 1, and k$_4$ denotes an integer from 1 to 10.

Very particularly preferred groups P are selected from the group consisting of CH$_2$=CW$^1$—CO—O—, in particular $CH_2$=CH—CO—O—, $CH_2$=C($CH_3$)—CO—O— and $CH_2$=CF—CO—O—, furthermore $CH_2$=CH—O—, $(CH_2$=CH$)_2$CH—O—CO—,

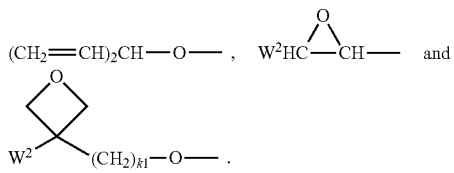

Further very particularly preferred groups P are selected from the group consisting of vinyloxy, acrylate, methacrylate, fluoroacrylate, chloroacrylate, oxetane and epoxide groups, and particularly preferably denote an acrylate or methacrylate group.

Preferred spacer groups Sp are selected from the formula Sp"-X", so that the radical "P-Sp-" conforms to the formula "P-Sp"-X"—", where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, $R^{00}$ and $R^{000}$ each, independently of one another, denote H or alkyl having 1 to 12 C atoms, and $Y^2$ and $Y^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and R$^{00}$ and R$^{000}$ have the meanings indicated above.

Particularly preferred groups -Sp"-X"— are —(CH$_2$)$_{p1}$—, —(CH$_2$)$_{q1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, P denotes a radical containing two or more polymerisable groups (multifunctional polymerisable radicals). Suitable radicals of this type and polymerisable compounds containing them and the preparation thereof are described, for example, in U.S. Pat. No. 7,060,200 B1 or US 2006/0172090 A1. Particular preference is given to multifunctional polymerisable radicals selected from the following formulae:

| | |
|---|---|
| —X-alkyl-CHP$^1$—CH$_2$—CH$_2$P$^2$ | I*a |
| —X-alkyl-C(CH$_2$P$^1$)(CH$_2$P$^2$)—CH$_2$P$^3$ | I*b |
| —X-alkyl-CHP$^1$CHP$^2$—CH$_2$P$^3$ | I*c |
| —X-alkyl-C(CH$_2$P$^1$)(CH$_2$P$^2$)—C$_{aa}$H$_{2aa+1}$ | I*d |
| —X-alkyl-CHP$^1$—CH$_2$P$^2$ | I*e |
| —X-alkyl-CHP$^1$P$^2$ | I*f |
| —X-alkyl-CP$^1$P$^2$—C$_{aa}$H$_{2aa+1}$ | I*g |
| —X-alkyl-C(CH$_2$P$^1$)(CH$_2$P$^2$)—CH$_2$OCH$_2$—C(CH$_2$P$^3$)(CH$_2$P$^4$)CH$_2$P$^5$ | I*h |
| —X-alkyl-CH((CH$_2$)$_{aa}$P$^1$)((CH$_2$)$_{bb}$P$^2$) | I*i |
| —X-alkyl-CHP$^1$CHP$^2$—C$_{aa}$H$_{2aa+1}$ | I*k |
| —X'-alkyl-C(CH$_3$)(CH$_2$P$^1$)(CH$_2$P$^2$) | I*m | in which alkyl denotes a single bond or straight-chain or branched alkylene having 1 to 12 C atoms, in which one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl or CN, where R$^{00}$ and R$^{000}$ have the meanings indicated above, aa and bb each, independently of one another, denote 0, 1, 2, 3, 4, 5 or 6, X has one of the meanings indicated for X', and P$^{1-5}$ each, independently of one another, have one of the meanings indicated for P.

The radical R or R$^a$ which is different from P-Sp- in the formulae 1A-1D and 2A-2E and the sub-formulae thereof is preferably selected from straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

The radical R or R$^a$ which is different from P-Sp- in the formulae 1A-1D and 2A-2E and the sub-formulae thereof particularly preferably denotes alkyl having 1 to 12, preferably 5 to 12, C atoms, alkoxy having 1 to 12 C atoms or alkenyl having 2 to 11 C atoms, where, in addition, one or more H atoms in all these radicals may be replaced by F.

Very particularly preferred compounds of the formulae 1A-1D are selected from the following sub-formulae:

1A1
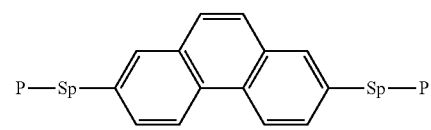

1A2
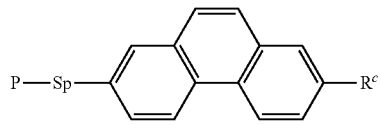

1B1
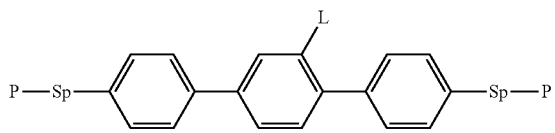

1C1
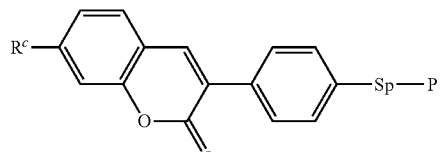

1C2
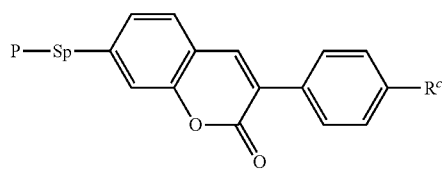

in which P, Sp and L have the meanings indicated for formula A, and $R^c$ has one of the meanings other than P-Sp- indicated above and below for R.

Particular preference is given to compounds of the formulae 1A-1D and the sub-formulae thereof in which P denotes acrylate or methacrylate.

Preference is furthermore given to compounds of the formulae 1A-1D and the sub-formulae thereof in which all radicals Sp present in the compound denote a single bond.

Preference is furthermore given to compounds of the formulae 1A-1D and the sub-formulae thereof which contain two radicals P-Sp and in which one of the radicals Sp denotes a single bond and the other of the radicals Sp is different from a single bond.

Preference is furthermore given to compounds of the formulae 1A-1D and the sub-formulae thereof in which the radical Sp which is different from a single bond denotes —(CH$_2$)$_{p1}$—, —(CH$_2$)$_{p1}$—O—, —(CH$_2$)$_{p1}$—O—CO— or —(CH$_2$)$_{p1}$—O—CO—O—, in which p1 denotes an integer from 1 to 12, preferably from 1 to 6, particularly preferably 1, 2 or 3, where these groups are linked to P in such a way that O atoms are not directly adjacent.

Preference is furthermore given to compounds of the formula 1B1 in which L is F.

Very particularly preferred compounds of the formulae 2A-2E are selected from the following sub-formulae:

2A1
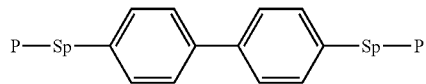

2B1
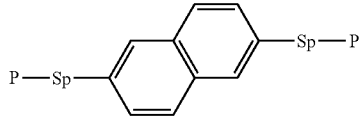

in which P, Sp and L have the meanings indicated for formula A.

Preference is furthermore given to compounds of the formulae 2A-2E and the sub-formulae thereof in which P denotes acrylate or methacrylate.

Preference is furthermore given to compounds of the formulae 2A-2E and the sub-formulae thereof in which all radicals Sp present in the compound denote a single bond.

Preference is furthermore given to compounds of the formulae 2A-2E and the sub-formulae thereof which contain two radicals P-Sp and in which one of the radicals Sp denotes a single bond and the other of the radicals Sp is different from a single bond.

Preference is furthermore given to compounds of the formulae 2A-2E and the sub-formulae thereof in which the radical Sp which is different from a single bond denotes —(CH$_2$)$_{p1}$—, —(CH$_2$)$_{p1}$—O—, —(CH$_2$)$_{p1}$—O—CO— or —(CH$_2$)$_{p1}$—O—CO—O—, in which p1 denotes an integer from 1 to 12, preferably from 1 to 6, particularly preferably 1, 2 or 3, where these groups are linked to P in such a way that O atoms are not directly adjacent.

The polymerisable compounds can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Particularly suitable and preferred processes for the preparation of polymerisable compounds of the formulae 1A-1D are depicted by way of example in the following schemes.

Compounds of the Formula 1A: see Schemes 1-3

Scheme 1:

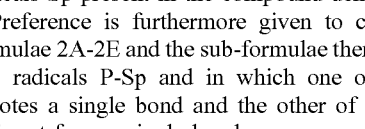

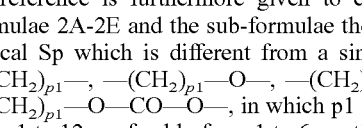

Cross-coupling reaction of dihaloaromatic compounds to arylmetal compounds (Hal, Hal' equal to or different from halogen).

Scheme 2:

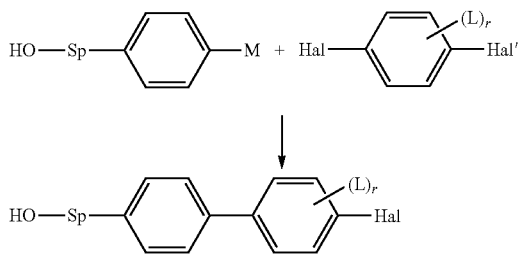

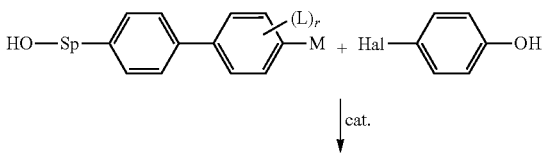

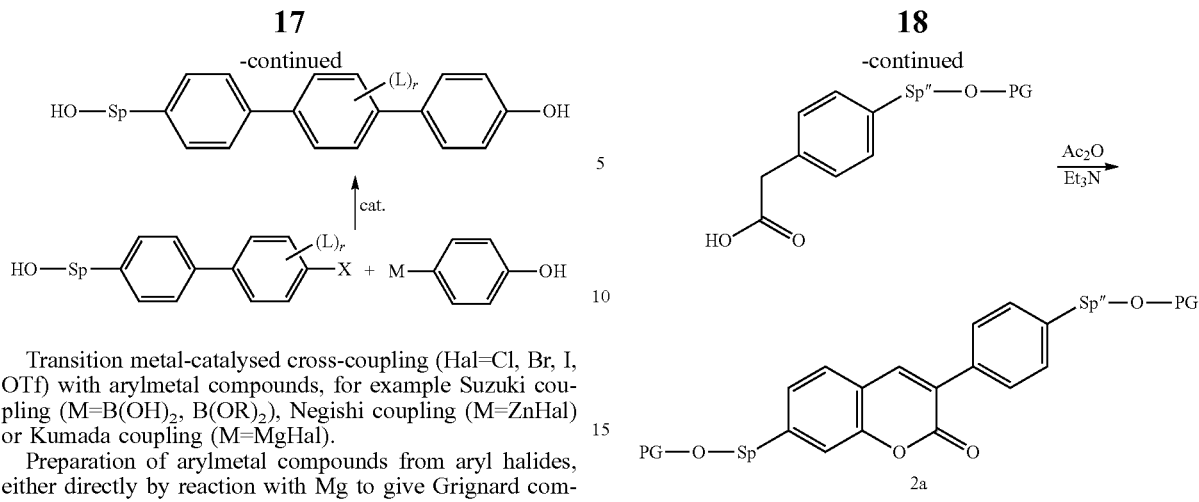

Transition metal-catalysed cross-coupling (Hal=Cl, Br, I, OTf) with arylmetal compounds, for example Suzuki coupling (M=B(OH)$_2$, B(OR)$_2$), Negishi coupling (M=ZnHal) or Kumada coupling (M=MgHal).

Preparation of arylmetal compounds from aryl halides, either directly by reaction with Mg to give Grignard compounds, or Hal-Li exchange with BuLi and subsequent transmetallation with Zn or Mg salts. Reaction of the Li compounds with trialkyl borates gives boronic acid esters, from which the free boronic acids are obtained by hydrolysis. The free OH groups may optionally carry protecting groups.

Scheme 3:

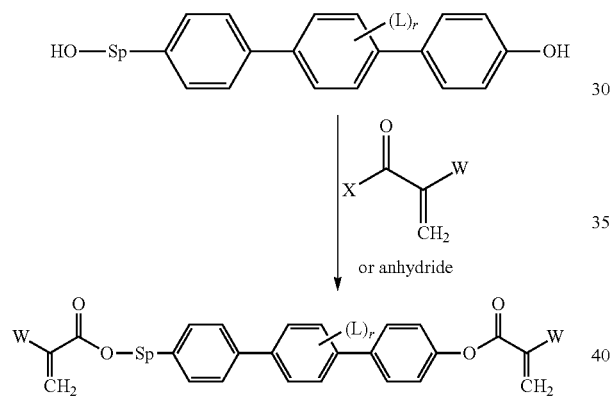

(W=H or CH$_3$; X=Cl or OH; L, r, Sp as defined in formula 2A)

Esterification using (meth)acryloyl chloride or (meth)acrylic anhydride in the presence of a base and optionally DMAP, or esterification using (meth)acrylic acid in the presence of a dehydrating agent, for example using DCC by the Steglich method.

Compounds of the Formula 1B

Compounds of the formula 1B in which P denotes methacrylate (phenanthryl 2,7-dimethacrylate) and the preparation thereof are described in JP 63-233952.

Compounds of the Formula 1C, 1D: see Schemes 4-8

(PG=protecting group or H, Sp, Sp"=Sp as defined for formula 1C)

Scheme 4:

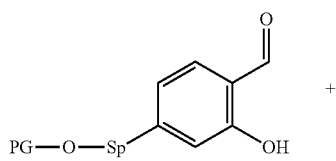

General access to coumarines is provided, for example, by condensation of salicylaldehydes with phenylacetic acid derivatives in a Perkin reaction in accordance with Scheme 4, as described, for example, for hydroxyphenylcoumarines in S. Kirkiacharian et al., Annales Pharmaceutiques Francaises (2003), 61(1), 51-56.

Scheme 5:

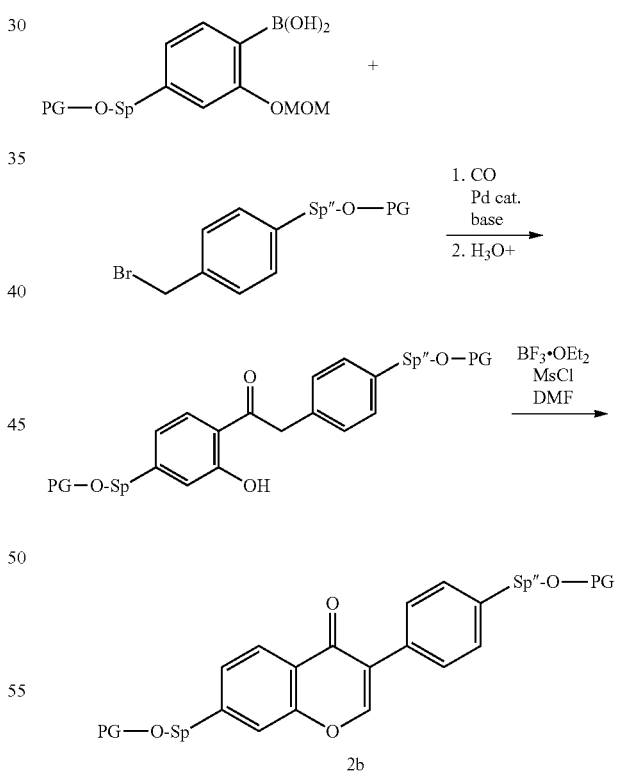

Isoflavones are accessible in accordance with R. J. Bass, Chem. Comm. 1976, 78, by treatment of benzyl aryl ketones with boron trifluoride etherate in the presence of mesyl chloride in dimethylformamide. The ketones themselves can be prepared in a simple manner by carbonylating Suzuki reaction in accordance with A. Suzuki et al. J. Org. Chem. 1998, 63, 4762.

Scheme 6:

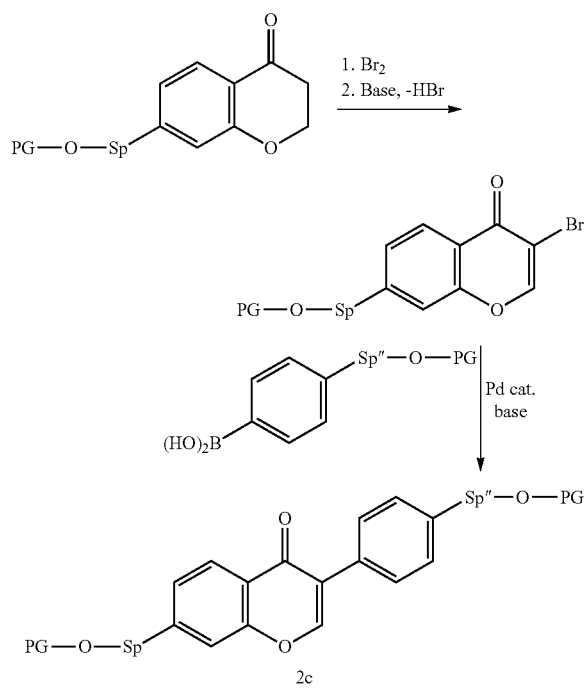

Alternatively, isoflavones can also be obtained in accordance with K. M. Dawood, Tetrahedron 2007, 63, 9642 from chromanones via the corresponding bromoisoflavones by Suzuki reaction.

Scheme 7:

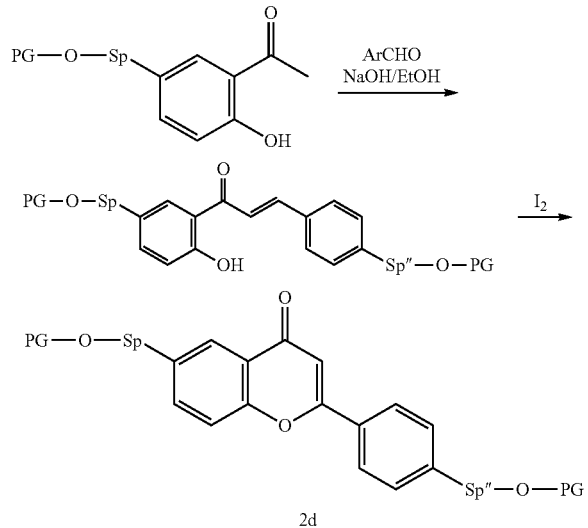

Flavones are prepared, for example, by Baker-Venkataraman rearrangement (W. Baker, Nature 1952, 169,706) or can be prepared in accordance with E. U. Mughal et al., Bioorg. Med. Chem. 2006, 14, 4704 from o-acylphenols by aldol condensation with aromatic aldehydes and subsequent oxidative cyclisation.

Scheme 8:

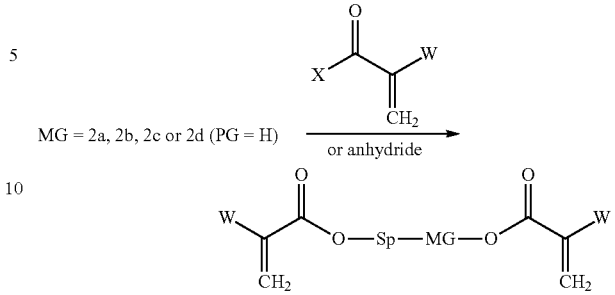

(W=H or $CH_3$; X=Cl or OH; L, r, Sp as defined for formula 2C)

Esterification of 2a, 2b, 2c, 2d (in which PG=H) using (meth)acryloyl chloride or (meth)acrylic anhydride in the presence of a base and optionally DMAP, or esterification using (meth)acrylic acid in the presence of a dehydrating agent, for example using DCC by the Steglich method.

For the production of PSA displays, the polymerisable compounds are polymerised or crosslinked (if one compound contains two or more polymerisable groups) by in-situ polymerisation in the LC medium between the substrates of the LC display with application of a voltage. The polymerisation can be carried out in one step. It is also possible firstly to carry out the polymerisation with application of a voltage in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV photopolymerisation.

The polymerisable mixtures according to the invention are, in particular, suitable for polymerisation without further initiator, which is accompanied by considerable advantages, such, for example, lower material costs and in particular less contamination of the LC medium by possible residual amounts of the initiator or degradation products thereof. The polymerisation can be carried out without the addition of an initiator. In a preferred embodiment, the LC medium thus comprises no polymerisation initiator (apart from the first polymerisable compound, which acts as initiator for the second polymerisable compound).

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component A), is preferably 10-10,000 ppm, particularly preferably 50-500 ppm.

The total concentration of all polymerisable compounds, preferably selected from the formulae 1A-1D and 2A-2E mentioned above, and the sub-formulae thereof, in the LC medium according to the invention is preferably ≤9.0% by weight, furthermore preferably ≤5.0% by weight, particularly preferably ≤3.0% by weight, very particularly preferably ≤1.5% by weight, in particular ≤0.5% by weight.

The concentration of the first polymerisable compound, in particular selected from the formulae 1A-1D, in the LC medium according to the invention is preferably 0.01 to 4.0% by weight, furthermore preferably 0.01 to 1.0% by weight, particularly preferably 0.01 to 0.1% by weight, very particularly preferably 0.01 to 0.05% by weight.

The concentration of the second polymerisable compound, in particular selected from the formulae 2A-2E, in the LC medium according to the invention is preferably 0.1 to 5.0% by weight, furthermore preferably 0.1 to 2.0% by weight, particularly preferably 0.1 to 1.0% by weight, very particularly preferably 0.1 to 0.5% by weight.

Preference is furthermore given to LC media in which the polymerisable component (component A) comprises exclusively polymerisable compounds according to the invention selected from the formulae 1A-1D and 2A-2E.

Preference is furthermore given to LC media in which component B) is an LC compound or an LC mixture which has a nematic liquid-crystal phase.

Preference is furthermore given to achiral polymerisable compounds according to the invention and LC media in which the compounds of component A) and/or B) are selected exclusively from the group consisting of achiral compounds.

Preference is furthermore given to LC media in which the polymerisable mixture or component A) comprises one or more polymerisable compounds containing one polymerisable group (monoreactive) and one or more polymerisable compounds containing two or more, preferably two, polymerisable groups (di- or multireactive).

Preference is furthermore given to PSA displays and LC media in which the polymerisable mixture or component A) comprises exclusively polymerisable compounds containing two polymerisable groups (direactive).

The proportion of the polymerisable mixture or component A) in the LC media according to the invention is preferably <5%, particularly preferably <1%, very particularly preferably <0.5%.

The proportion of the liquid-crystalline component or component B) in the LC media according to the invention is preferably >95%, particularly preferably >99%.

In addition to the compounds mentioned above, the polymerisable mixtures may also comprise one or more further polymerisable compounds (comonomers), which are preferably mesogenic or liquid-crystalline. Suitable and preferred mesogenic comonomers, particularly for use in PSA displays, are selected, for example, from the following formulae:

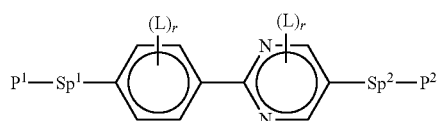

M1

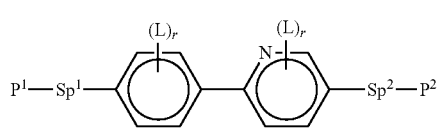

M2

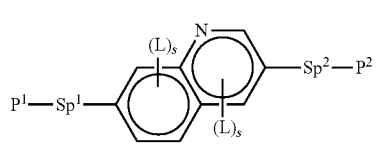

M3

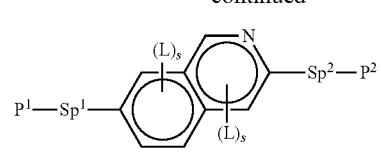

M4

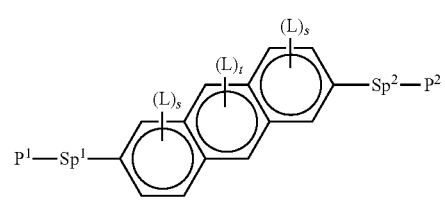

M5

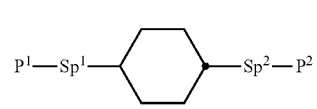

M6

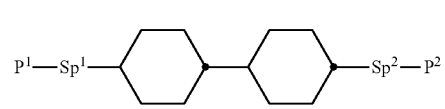

M7

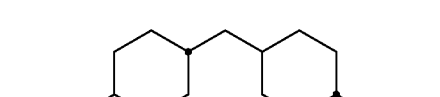

M8

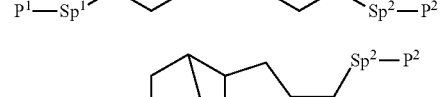

M9

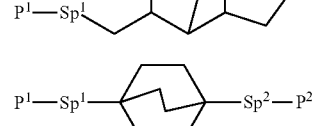

M10

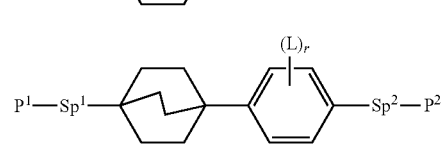

M11 in which the individual radicals have the following meanings:

$P^1$ and $P^2$ each, independently of one another, denote a polymerisable group, preferably having one of the meanings indicated above and below for P, particularly preferably an acrylate, methacrylate, fluoroacrylate, oxetane, vinyloxy or epoxide group, $Sp^1$ and $Sp^2$ each, independently of one another, denote a single bond or a spacer group, preferably having one of the meanings indicated above and below for Sp, and particularly preferably denote —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking to the adjacent ring in the last-mentioned groups takes place via the O atom, where, in addition, one or more of the radicals $P^1$-$Sp^1$- and $P^2$-$Sp^2$- may denote $R^{aa}$, with the proviso that at least one of the radicals $P^1$-$Sp^1$- and $P^2$-$Sp^2$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)=C(R^{00})$—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for polymerisation of the polymerisable compounds. In principle, any LC mixture which is suitable for use in conventional VA and OCB displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

Particularly preferred LC displays, LC host mixtures and LC media of this type are mentioned in sections a)-x) below:

a) LC medium which comprises one or more compounds of the formula CY and/or PY:

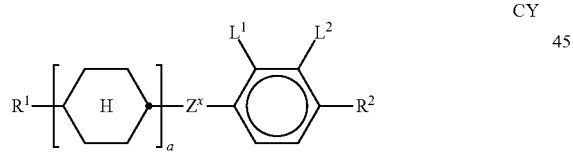

CY

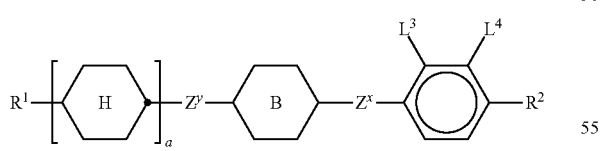

PY in which the individual radicals have the following meanings:

a denotes 1 or 2, b denotes 0 or 1,

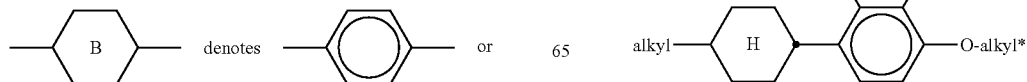

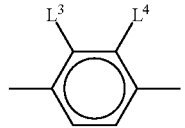

-continued $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl, or both radicals $L^3$ and $L^4$ denote F or one of the radicals $L^3$ and $L^4$ denotes F and the other denotes Cl.

The compounds of the formula CY are preferably selected from the group consisting of the following sub-formulae:

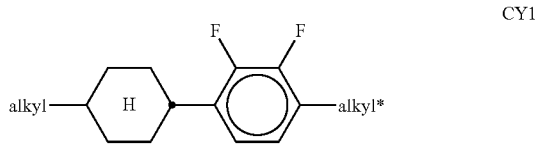

CY1

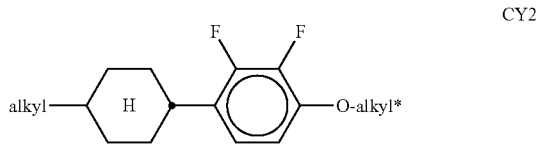

CY2

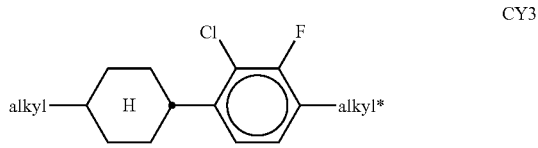

CY3

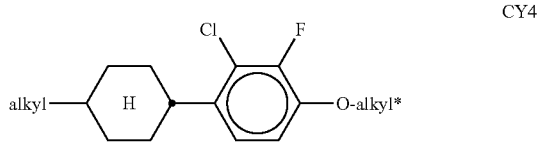

CY4

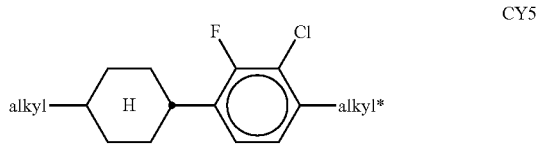

CY5

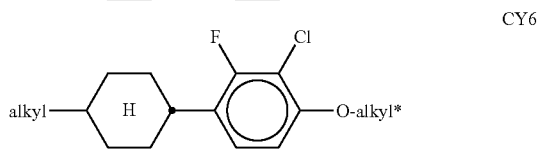

CY6

CY7 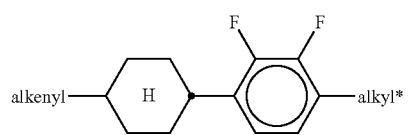
CY8 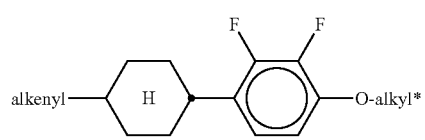
CY9 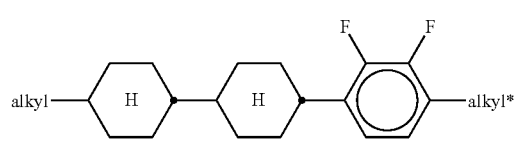
CY10 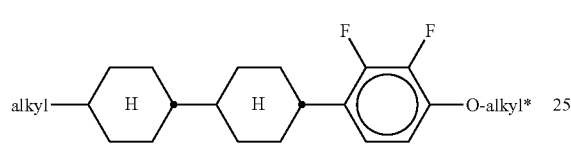
CY11 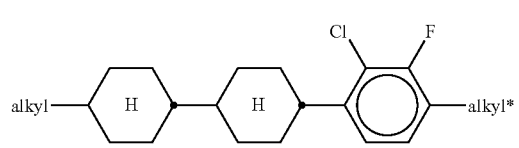
CY12 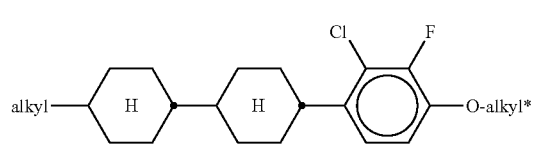
CY13 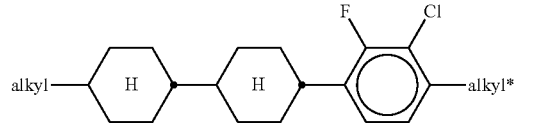
CY14 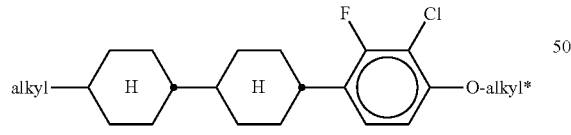
CY15 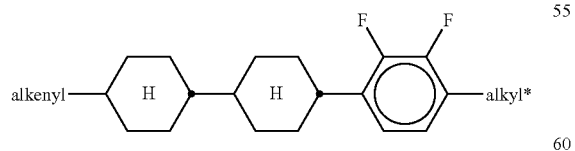
CY16 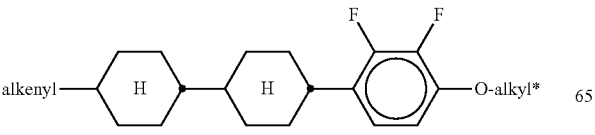
CY17 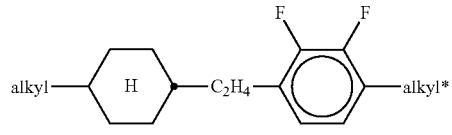
CY18 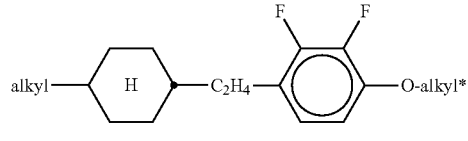
CY19 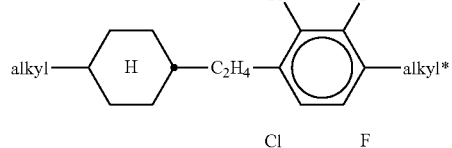
CY20 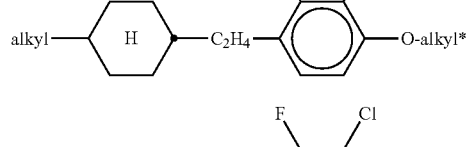
CY21 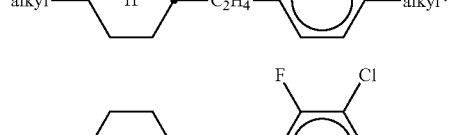
CY22 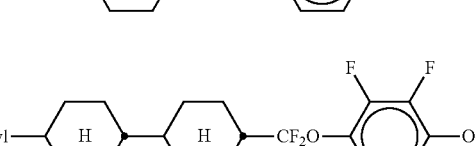
CY23 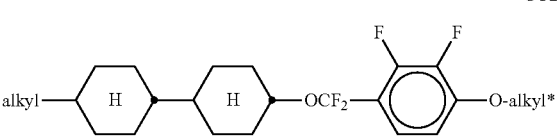
CY24 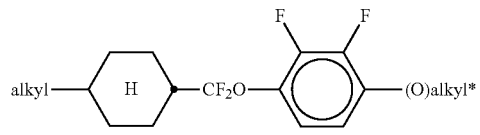
CY25 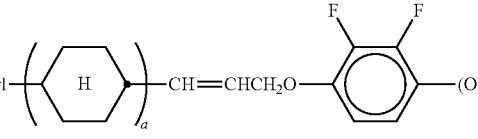
CY26 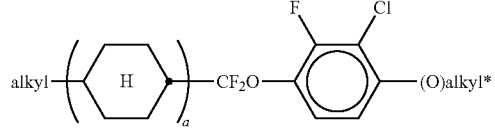
CY27

-continued

CY28
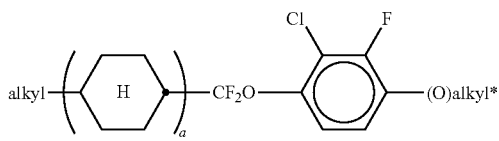

CY29
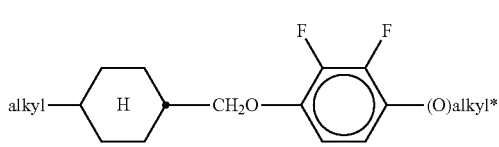

CY30
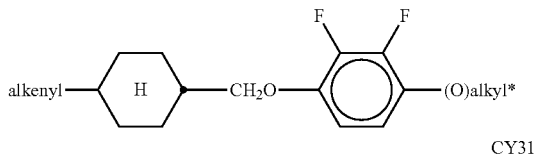

CY31
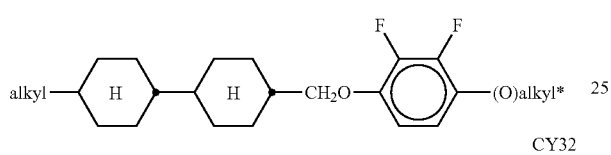

CY32
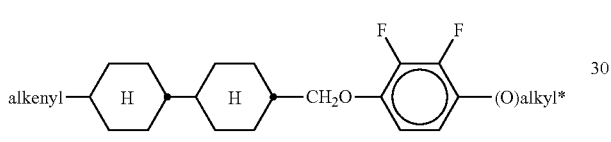

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula PY are preferably selected from the group consisting of the following sub-formulae:

PY1
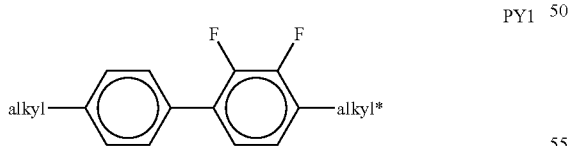

PY2
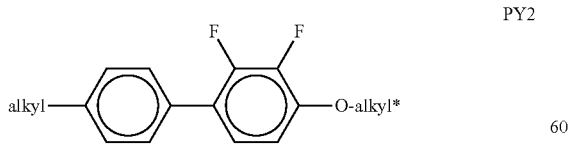

PY3
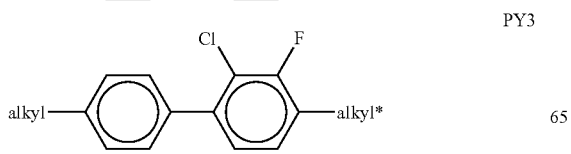

-continued

PY4
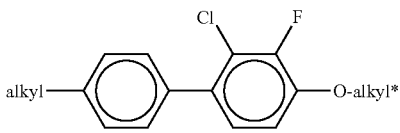

PY5
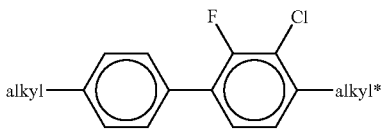

PY6
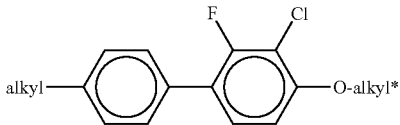

PY7
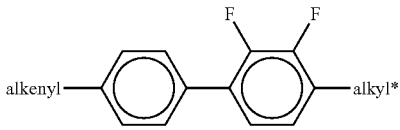

PY8
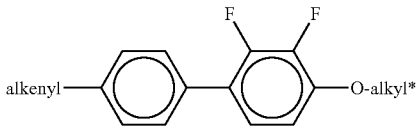

PY9
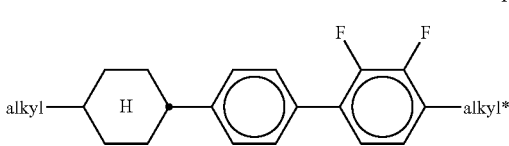

PY10
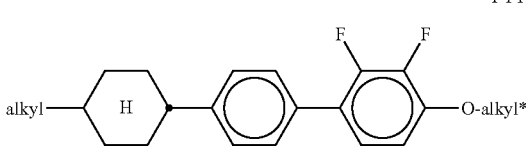

PY11
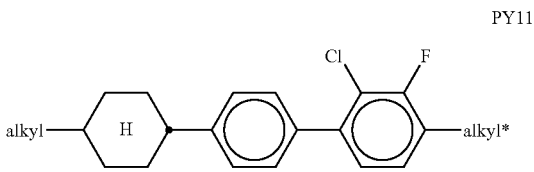

PY12

PY13
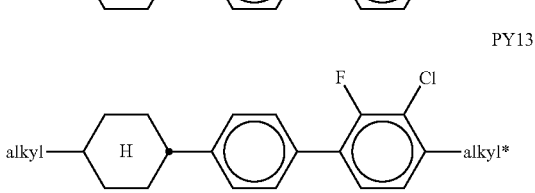

-continued

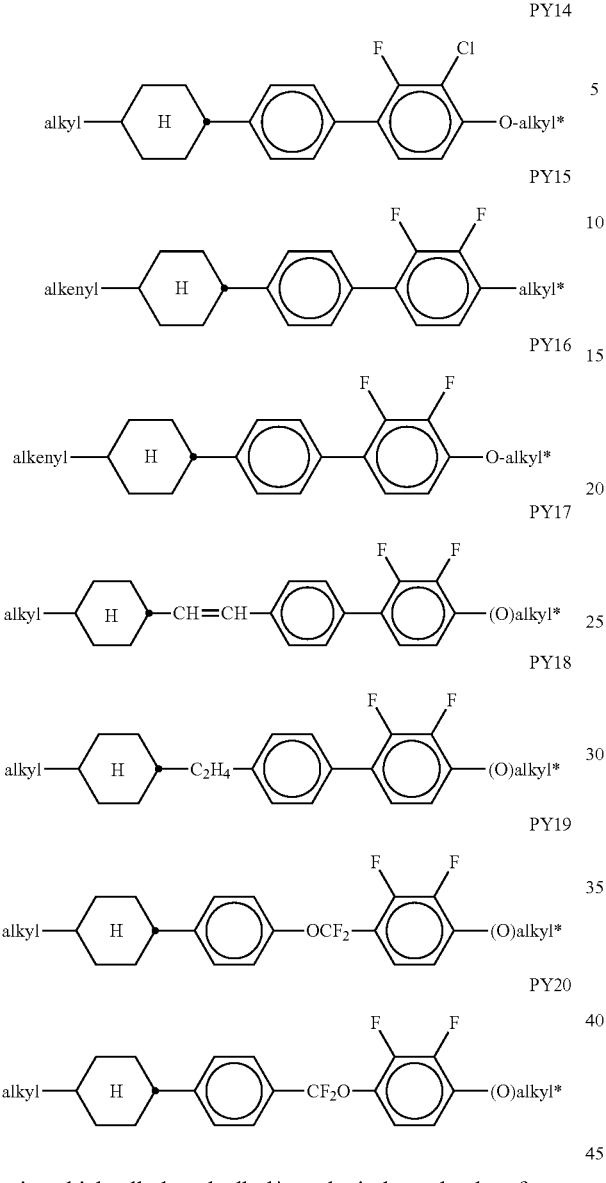

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

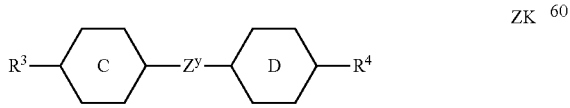

in which the individual radicals have the following meanings:

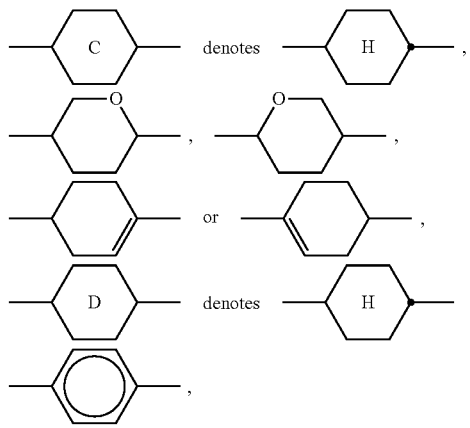

$R^3$ and $R^4$ each, independently of one another, denote alkyl having 1 to 12 C atoms, in which, in addition, one or two non-adjacent $CH_2$ groups may be replaced by $-O-$, $-CH=CH-$, $-CO-$, $-O-CO-$ or $-CO-O-$ in such a way that O atoms are not linked directly to one another, $Z^y$ denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond.

The compounds of the formula ZK are preferably selected from the group consisting of the following sub-formulae:

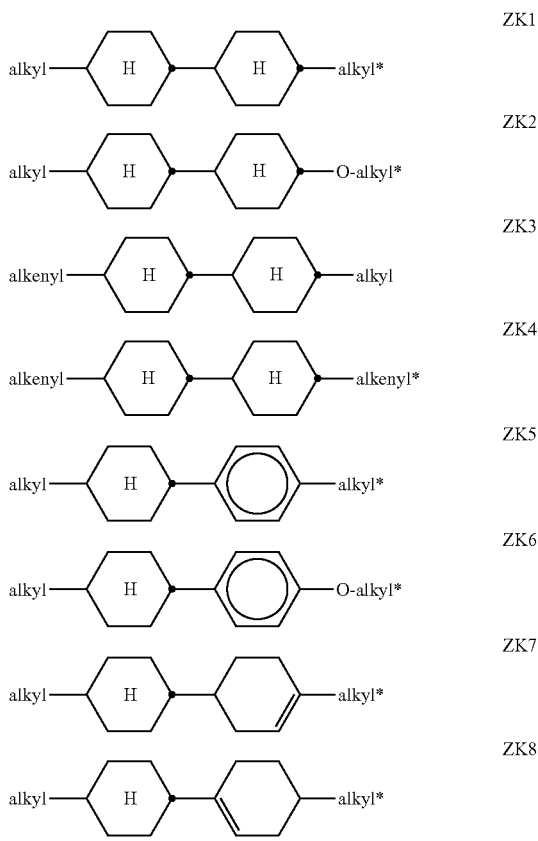

-continued

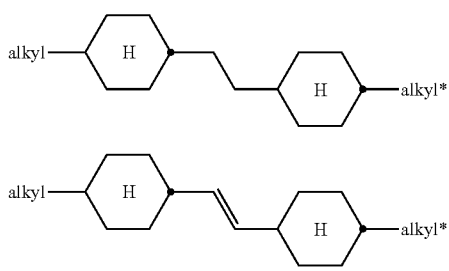

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

c) LC medium which additionally comprises one or more compounds of the following formula:

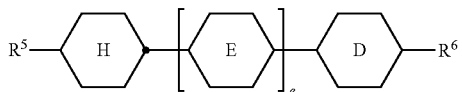

in which the individual radicals on each occurrence, identically or differently, have the following meanings:

$R^5$ and $R^6$ each, independently of one another, have one of the meanings indicated above for $R^1$,

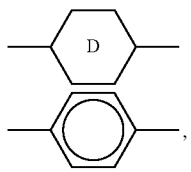 denotes 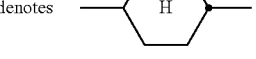 or

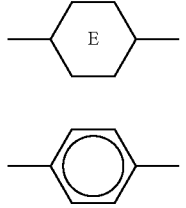 denotes 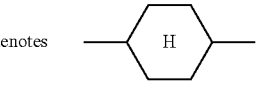,

 or 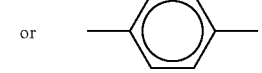, and e denotes 1 or 2.

The compounds of the formula DK are preferably selected from the group consisting of the following sub-formulae:

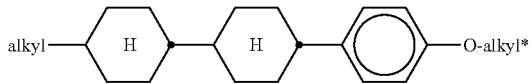

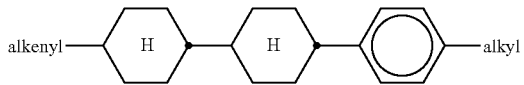

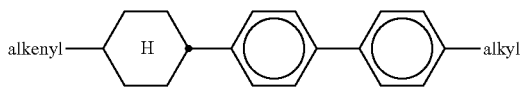

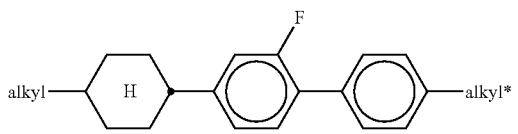

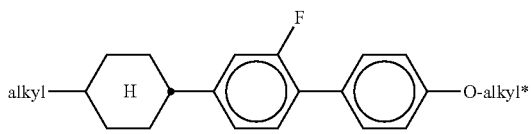

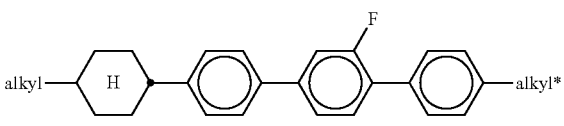

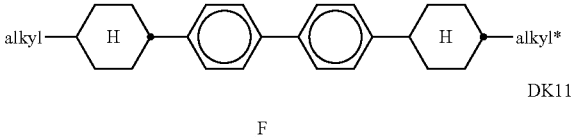

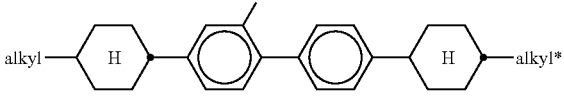

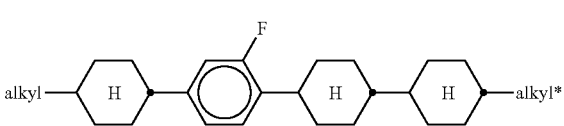

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-$ CH=CH—, CH₃—CH₂—CH=CH—, CH₃—(CH₂)₂—CH=CH—, CH₃—(CH₂)₃—CH=CH— or CH₃—CH=CH—(CH₂)₂—.

d) LC medium which additionally comprises one or more compounds of the following formula:

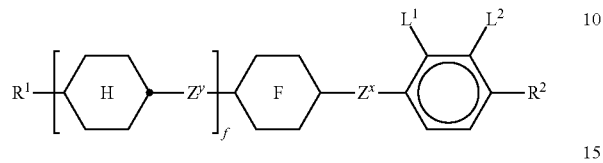

LY in which the individual radicals have the following meanings:

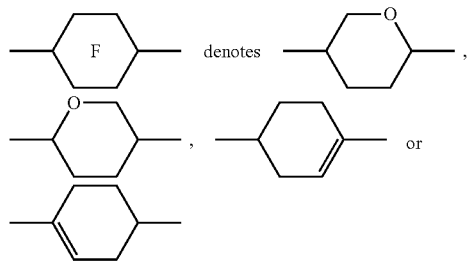

f denotes 0 or 1,

R¹ and R² each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, Z$^x$ and Z$^y$ each, independently of one another, denote —CH₂CH₂—, —CH=CH—, —CF₂O—, —OCF₂—, —CH₂O—, —OCH₂—, —CO—O—, —O—CO—, —C₂F₄—, —CF=CF—, —CH=CH—CH₂O— or a single bond, preferably a single bond, L¹ and L² each, independently of one another, denote F, Cl, OCF₃, CF₃, CH₃, CH₂F, CHF₂.

Preferably, both radicals L¹ and L² denote F or one of the radicals L¹ and L² denotes F and the other denotes Cl.

The compounds of the formula LY are preferably selected from the group consisting of the following sub-formulae:

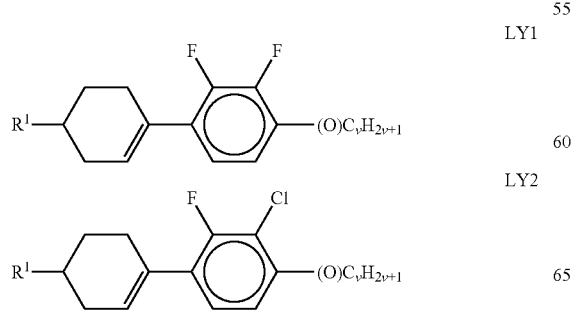

-continued

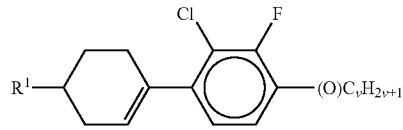
LY3

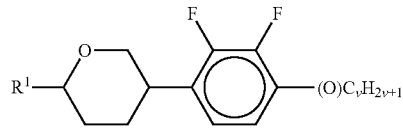
LY4

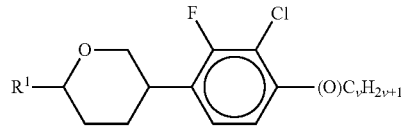
LY5

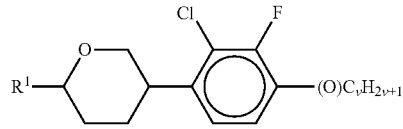
LY6

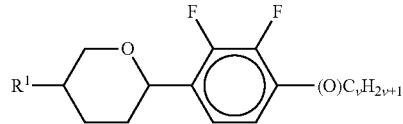
LY7

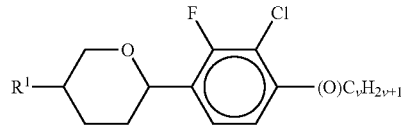
LY8

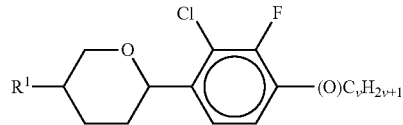
LY9

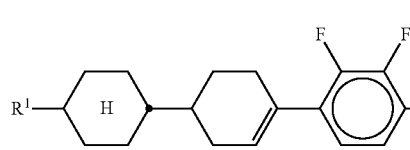
LY10

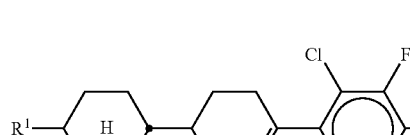
LY11

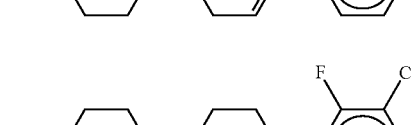
LY12

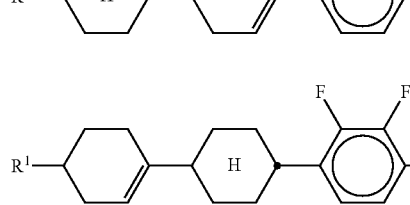
LY13

LY14
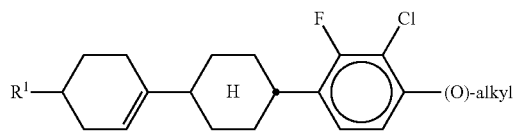

LY15
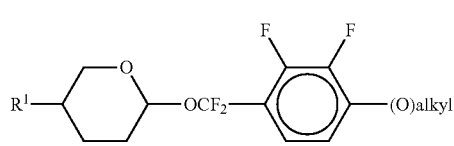

LY16
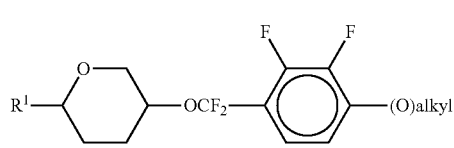

LY17
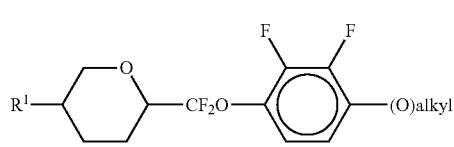

LY18
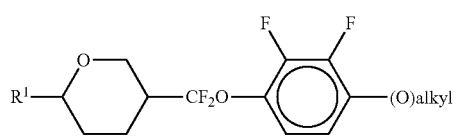

LY19
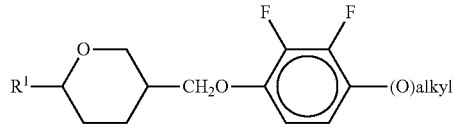

LY20
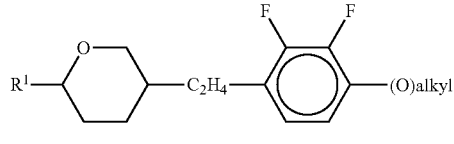

LY21
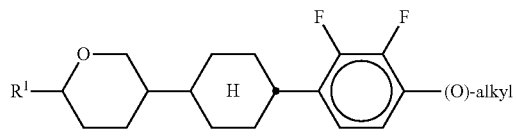

LY22
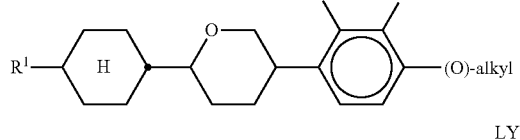

LY23
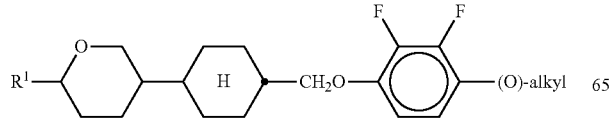

LY24
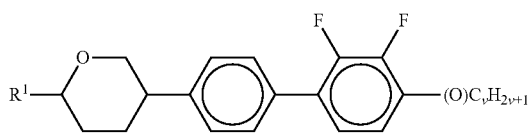

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

e) LC medium which additionally comprises one or more compounds selected from the group consisting of the following formulae:

G1
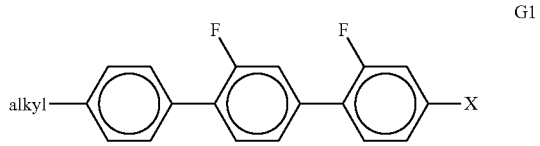

G2
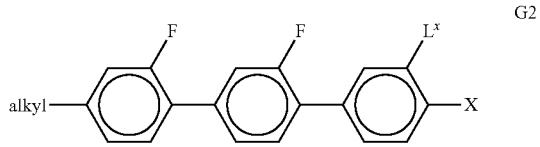

G3
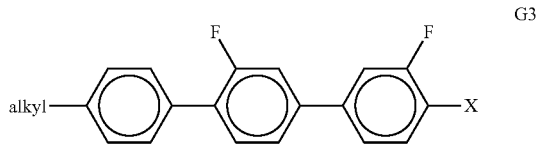

G4
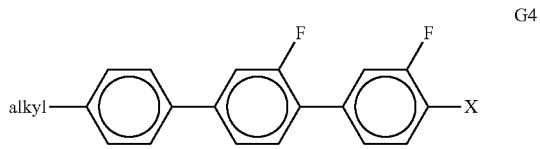

in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

f) LC medium which additionally comprises one or more compounds selected from the group consisting of the following formulae:

Y1
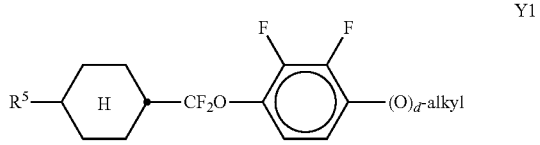

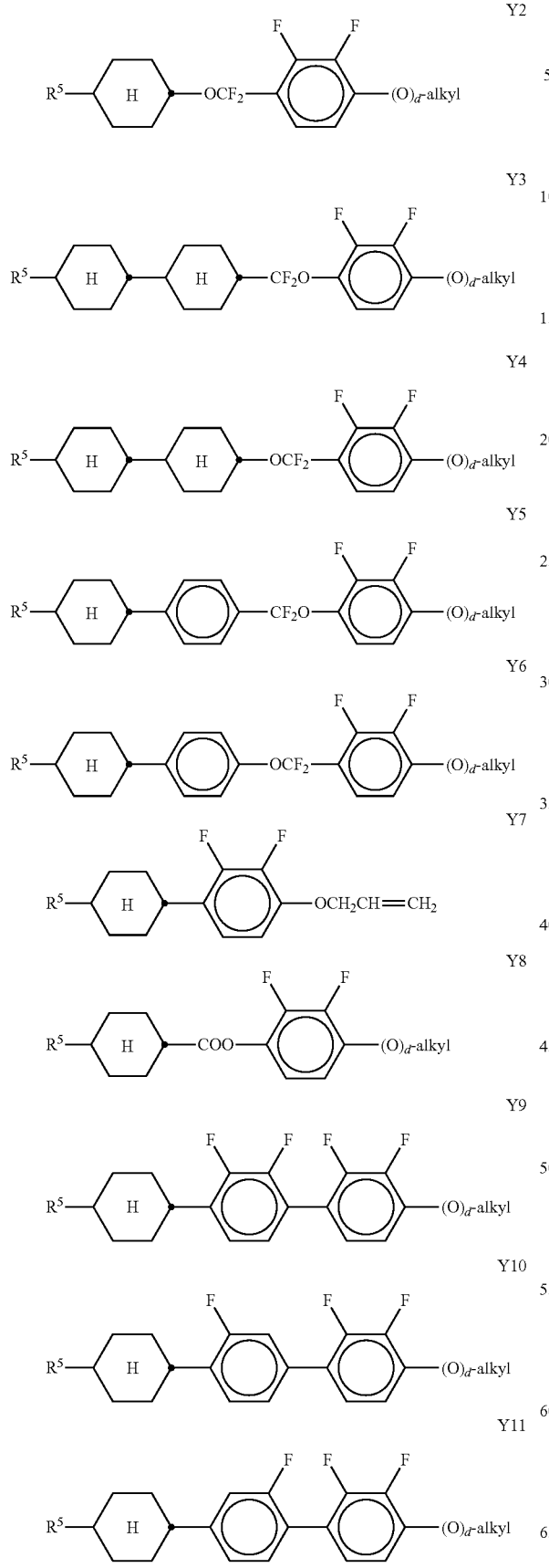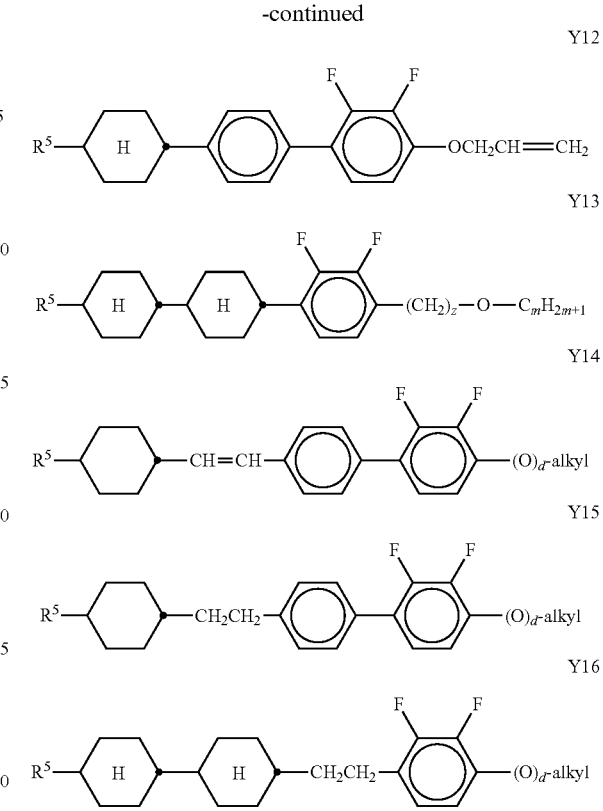

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

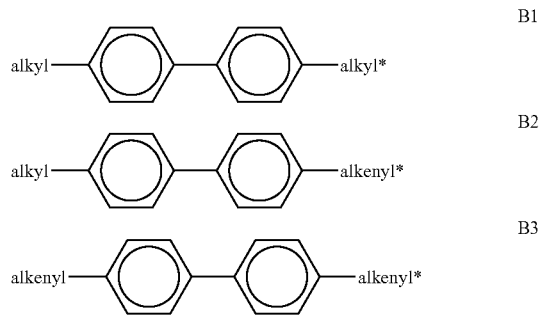

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-$ CH=CH—, CH₃—CH₂—CH=CH—, CH₃—(CH₂)₂—CH=CH—, CH₃—(CH₂)₃—CH=CH— or CH₃—CH=CH—(CH₂)₂—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

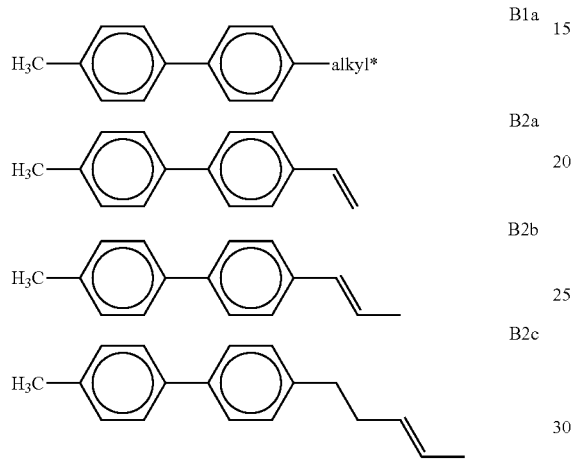

B1a
B2a
B2b
B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

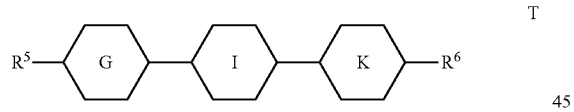

T in which $R^5$ and $R^6$ each, independently of one another, have one of the meanings indicated above for $R^1$, and

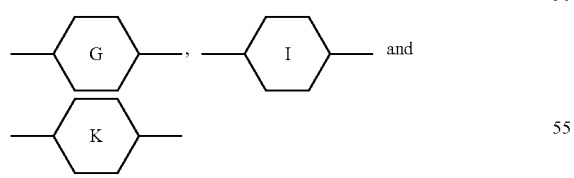

each, independently of one another, denote

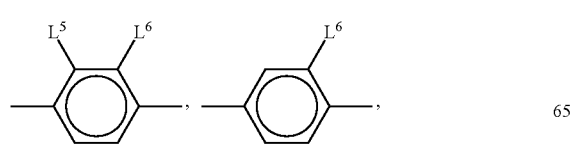

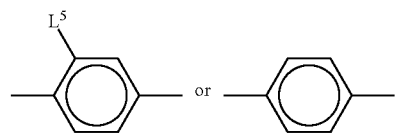

in which $L^5$ denotes F or Cl, preferably F, and $L^6$ denotes F, Cl, OCF₃, CF₃, CH₃, CH₂F or CHF₂, preferably F.

The compounds of the formula T are preferably selected from the group consisting of the following sub-formulae:

T1

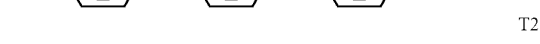
T2

T3

T4

T5

T6

T7

T8

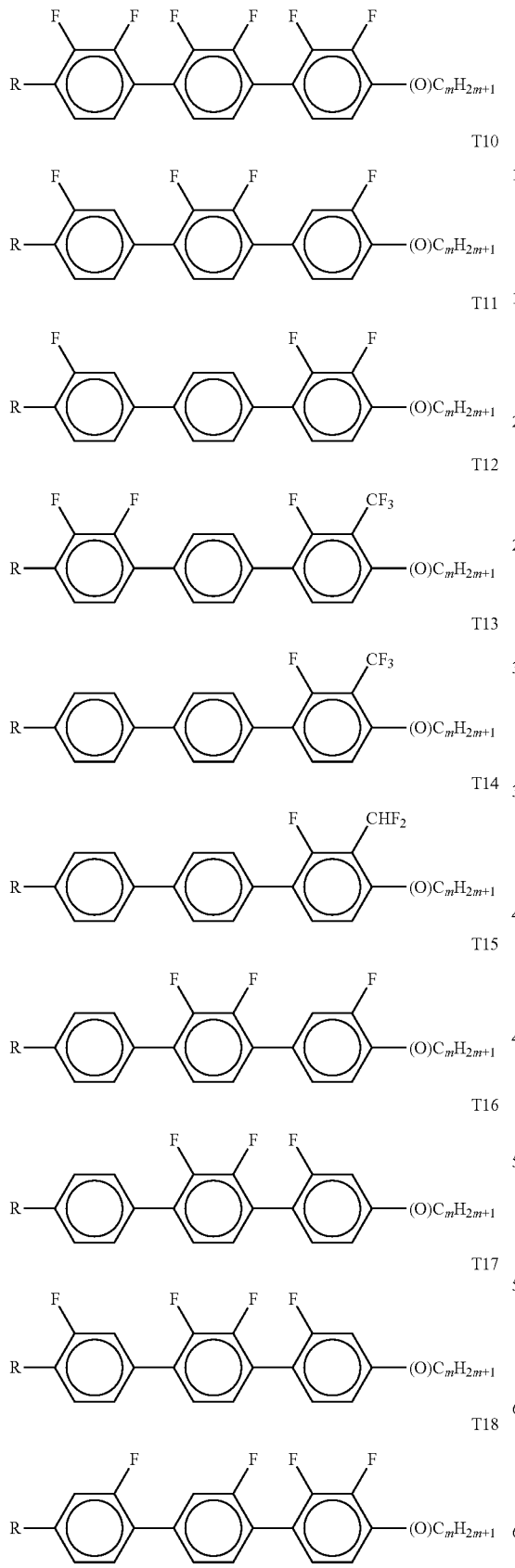
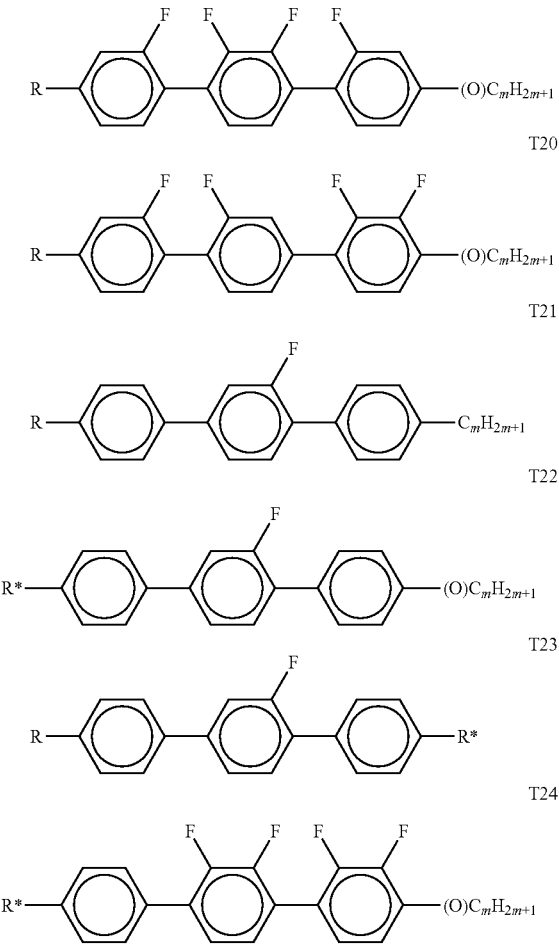

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

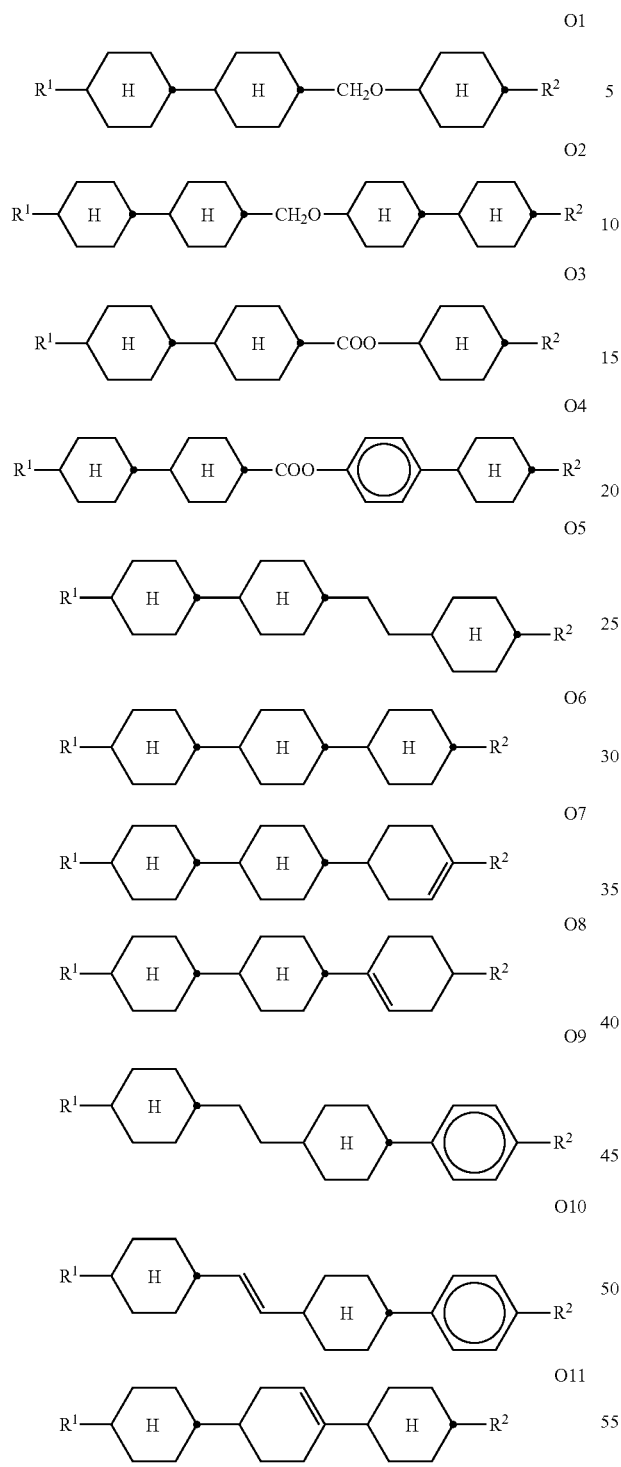

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

FI in which

L denotes H, $R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

FI1

FI2

FI3

FI4
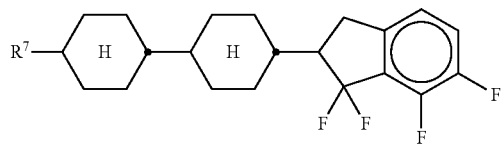

FI5
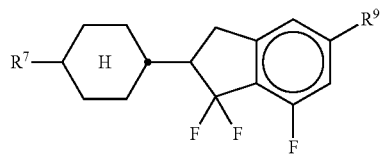

FI6
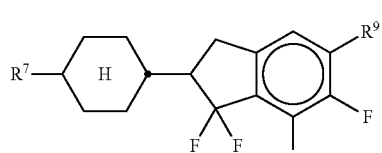

FI7
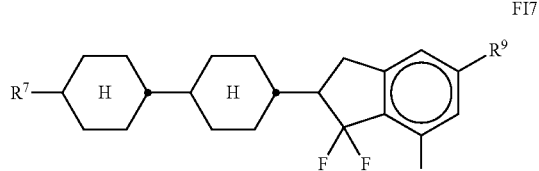

FI8
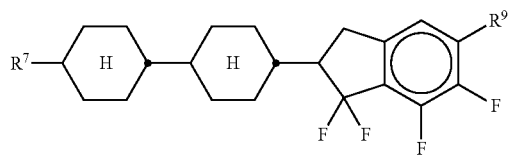

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

m) LC medium which additionally comprises one or more compounds selected from the group consisting of the following formulae:

VK1
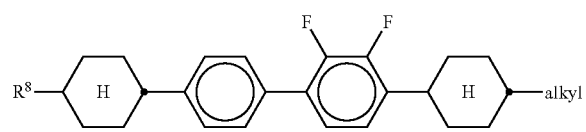

VK2
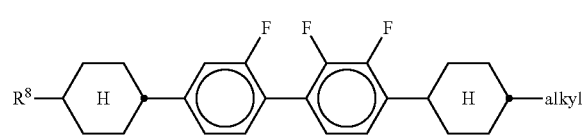

VK3
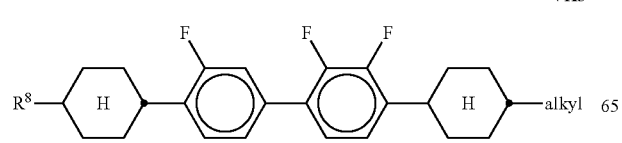

VK4
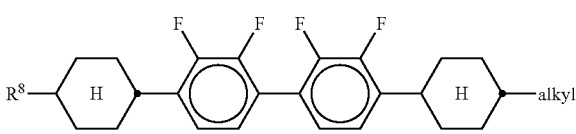

in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

N1
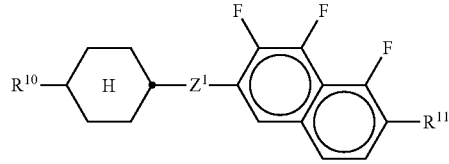

N2
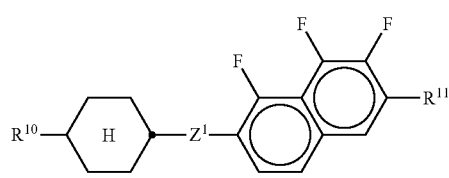

N3
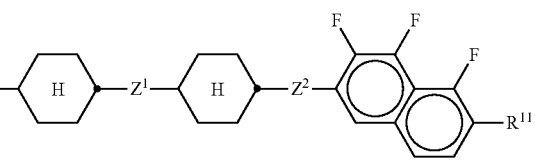

N4
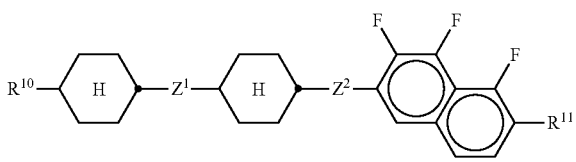

N5
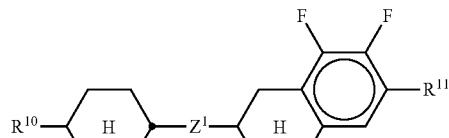

N6
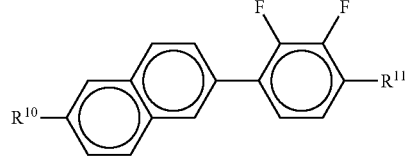

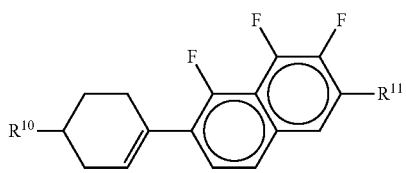
N7

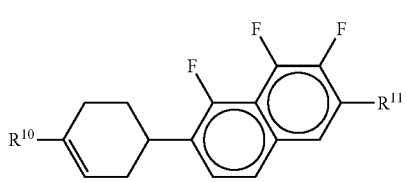
N8

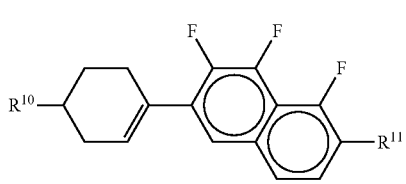
N9

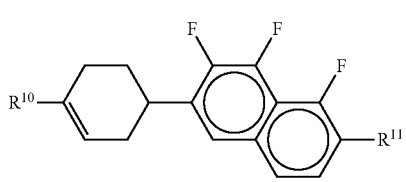
N10 in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CH—$CH_2CH_2$—, —$CH_2CH_2$CH=CH—, —$CH_2O$—, —$OCH_2$—, —CO—O—, —O—CO—, —$C_2F_4$—, —CF=CF—, —CF=CH—, —CH=CF—, —$CH_2$— or a single bond.

o) LC medium which additionally comprises one or more difluoro-dibenzochromans and/or chromans of the following formulae:

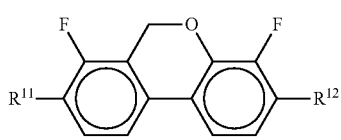
BC

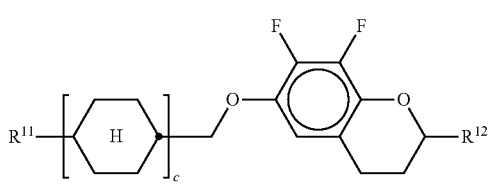
CR

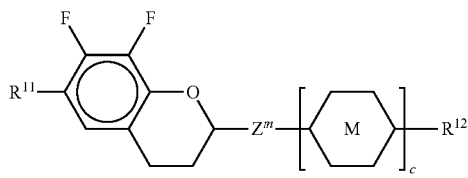
RC in which $R^{11}$ and $R^{12}$ each, independently of one another, have the meanings indicated above, M denotes trans-1,4-cyclohexylene or 1,4-phenylene, $Z^m$ denotes —$C_2H_4$—, —$CH_2O$—, —$OCH_2$—, —CO—O— or —O—CO—, and c denotes 0 or 1, preferably in amounts of 3 to 20% by weight, in particular in amounts of 3 to 15% by weight.

Particularly preferred compounds of the formulae BC and CR are selected from the group consisting of the following sub-formulae:

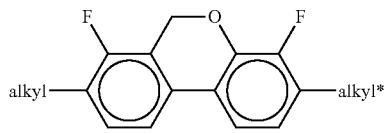
BC1

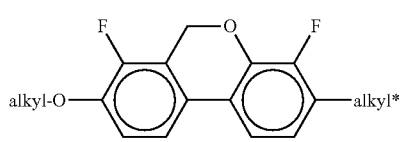
BC2

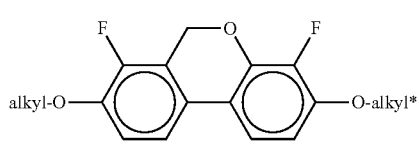
BC3

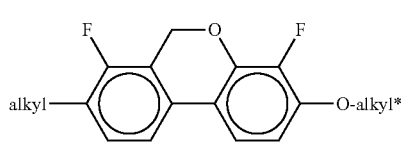
BC4

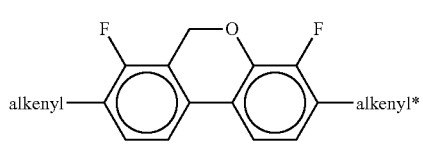
BC5

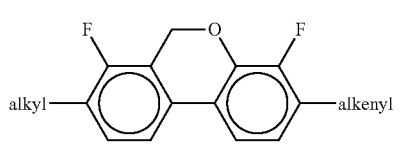
BC6

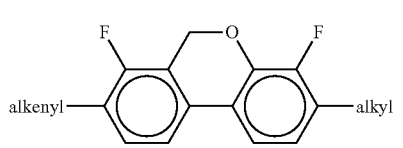
BC7

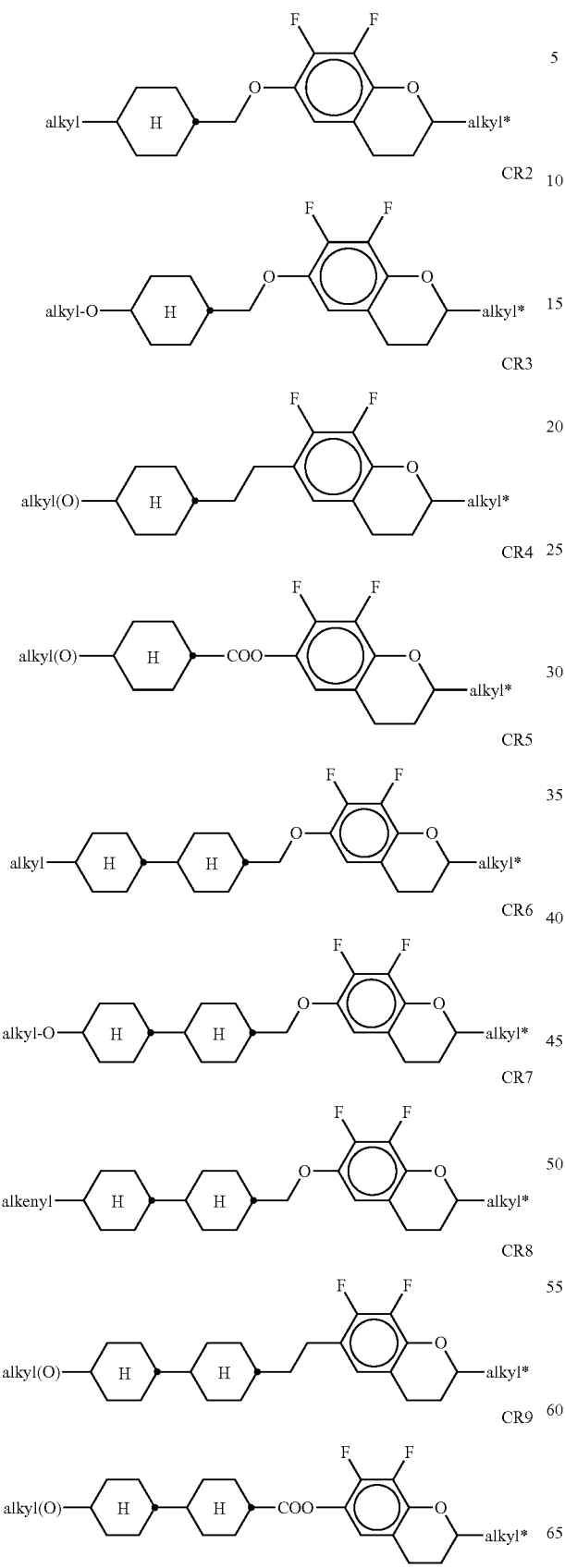

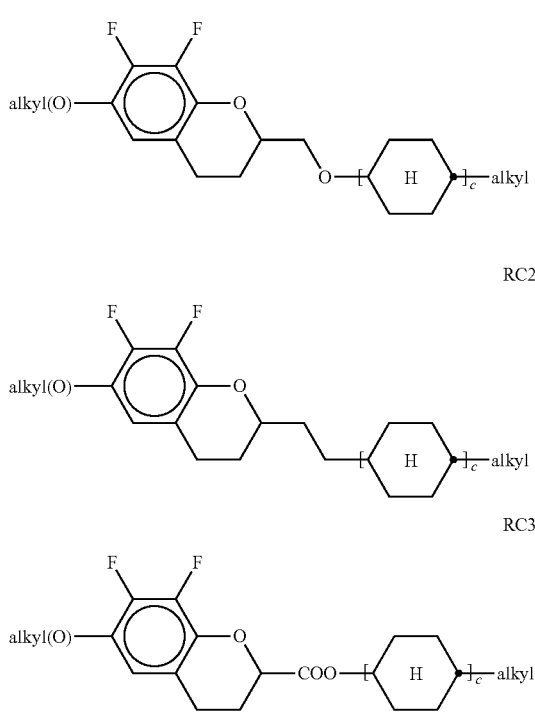

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

p) LC medium which additionally comprises one or more fluorinated phenanthrenes and/or dibenzofurans of the following formulae:

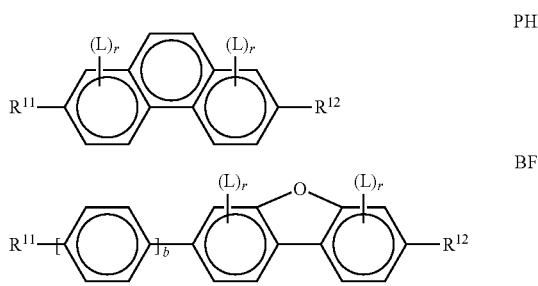

in which $R^{11}$ and $R^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

PH1
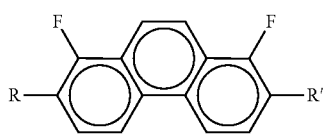

PH2
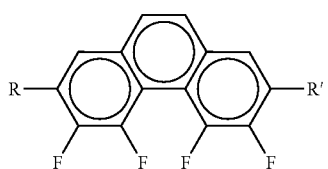

BF1
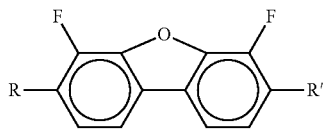

BF2
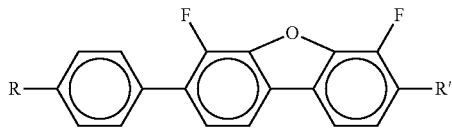

in which R and R' each, independently of one another, denote a straight-chain alkyl or alkoxy radical having 1-7 C atoms.

q) LC medium, preferably for use in PSA-OCB, PSA-TN, PSA-IPS or PSA-FFS displays, which comprises one or more compounds selected from the group consisting of the following formulae:

AA
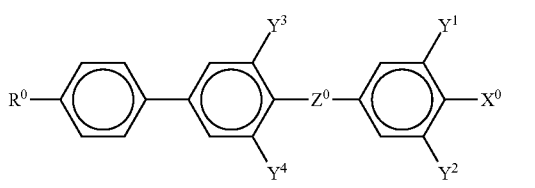

BB
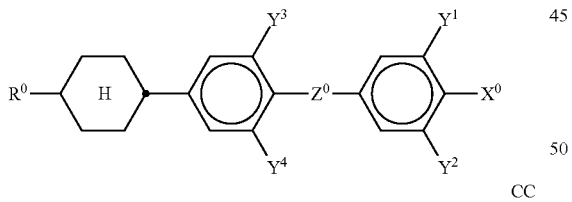

CC
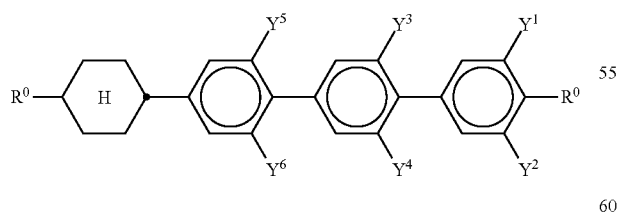

in which $R^0$ on each occurrence, identically or differently, denotes n-alkyl, alkoxy, oxaalkyl, fluoroalkyl or alkenyl, each having up to 9 C atoms, $X^0$ denotes F, Cl or in each case halogenated alkyl, alkenyl, alkenyloxy or alkoxy, each having up to 6 C atoms, $Z^0$ denotes —$CF_2O$— or a single bond, $Y^{1-6}$ each, independently of one another, denote H or F.

$X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, particularly preferably F or $OCF_3$.

The compounds of the formula AA are preferably selected from the group consisting of the following formulae:

AA1
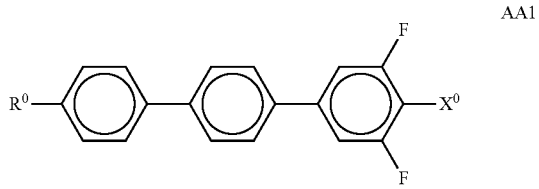

AA2
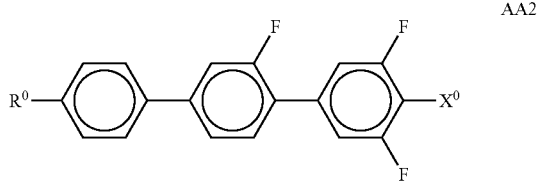

AA3
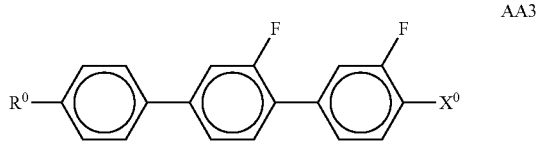

AA4
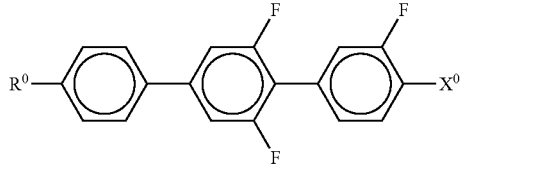

AA5
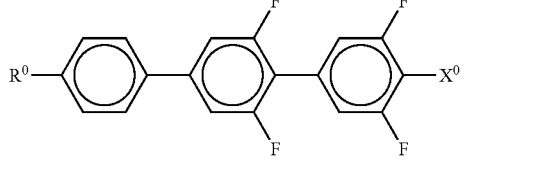

AA6
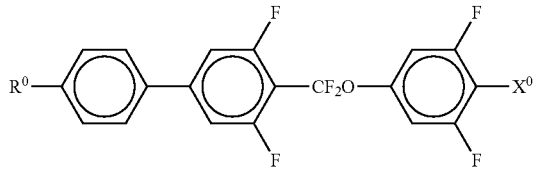

AA7
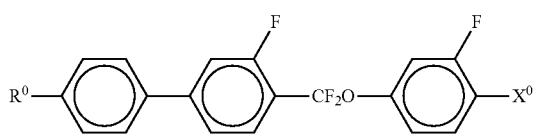

-continued

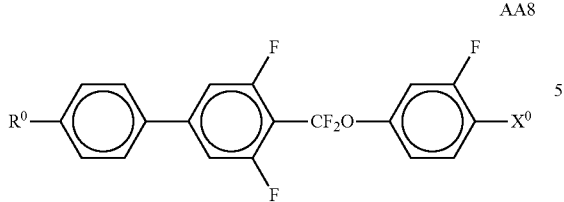
AA8

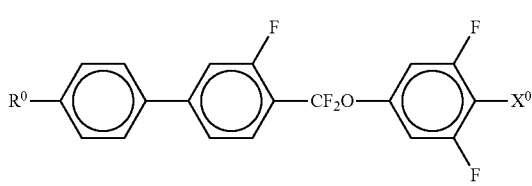
AA9 in which R⁰ and X⁰ have the meanings indicated above, and X⁰ preferably denotes F. Particular preference is given to compounds of the formulae AA2 and AA6.

The compounds of the formula BB are preferably selected from the group consisting of the following formulae:

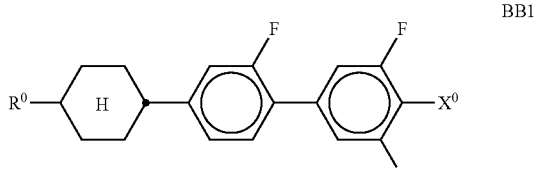
BB1

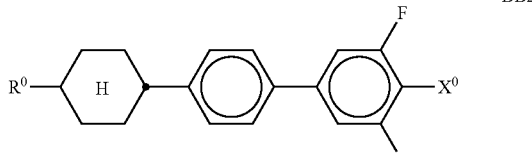
BB2

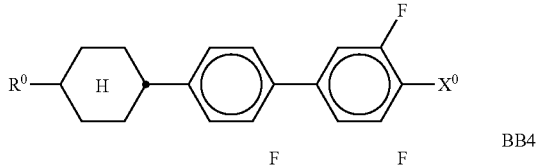
BB3

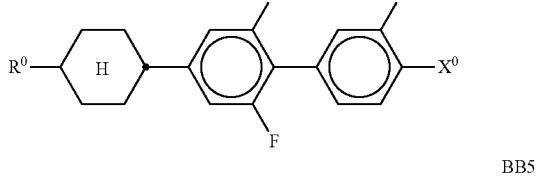
BB4

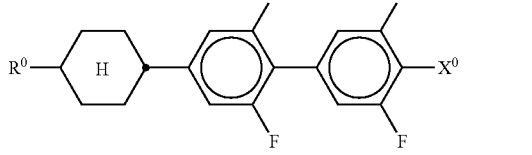
BB5

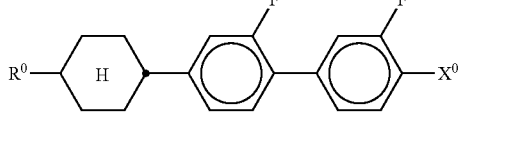
BB6 in which R⁰ and X⁰ have the meanings indicated above, and X⁰ preferably denotes F. Particular preference is given to compounds of the formulae BB1, BB2 and BB5.

The compounds of the formula CC are preferably selected from the following formula:

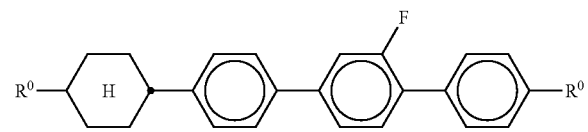
CC1 in which R⁰ on each occurrence, identically or differently, has the meaning indicated above and preferably denotes alkyl having 1 to 6 C atoms.

r) LC medium which, apart from the polymerisable compounds according to the invention, in particular of the formula I or sub-formulae thereof and the comonomers, comprises no compounds which contain a terminal vinyloxy group (—O—CH=CH₂).

s) LC medium which comprises 1 to 5, preferably 1, 2 or 3, polymerisable compounds, preferably selected from polymerisable compounds according to the invention, in particular of the formula I or sub-formulae thereof.

t) LC medium in which the proportion of polymerisable compounds, in particular of the formula I or sub-formulae thereof, in the mixture as a whole is 0.05 to 5%, preferably 0.1 to 1%.

u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the mixture as a whole is greater than 70%, preferably greater than 80%.

y) PSA-VA display in which the pretilt angle is preferably ≤85°, particularly preferably ≤80°.

The combination of compounds of the preferred embodiments a)-y) mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the PSA-VA type have a negative dielectric anisotropy Δε, preferably of about −0.5 to −10, in particular of about −2.5 to −7.5, at 20° C. and 1 kHz.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PSA-OCB type preferably have a positive dielectric anisotropy Δε, preferably of about +4 to +17 at 20° C. and 1 kHz.

The birefringence Δn in LC media according to the invention for use in displays of the VA type is preferably less than 0.16, particularly preferably between 0.06 and 0.14, in particular between 0.07 and 0.12.

The birefringence Δn in LC media according to the invention for use in displays of the OCB type is preferably between 0.14 and 0.22, in particular between 0.16 and 0.22.

The birefringence Δn in LC media according to the invention for use in displays of the PSA-TN, PSA-IPS or PSA-FFS type, is preferably between 0.07 and 0.15, in particular between 0.08 and 0.13. The dielectric anisotropy of these media is preferably between +2 and +17, in particular between +3 and +15.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

The LC media may, for example, comprise one or more chiral dopants, preferably those selected from the group consisting of compounds from Table B below.

Furthermore, it is possible to add to the LC media, for example, 0 to 15% by weight of pleochroic dyes, furthermore nanoparticles, conductive salts, preferably ethyldim-ethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The structure of the LC displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PSA-VA displays are described, for example, in US 2006/0066793 A1.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(n, m, z: in each case, independently of one another, 1, 2, 3, 4, 5 or 6)

TABLE A

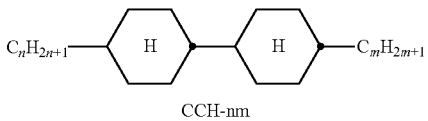

CCH-nm

TABLE A-continued
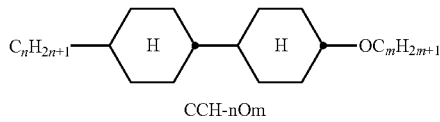
CCH-nOm
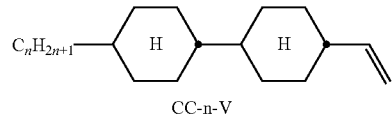
CC-n-V
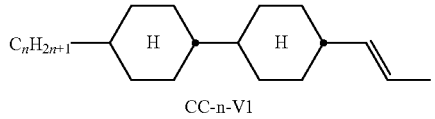
CC-n-V1
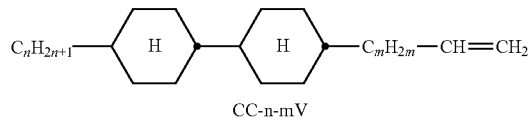
CC-n-mV
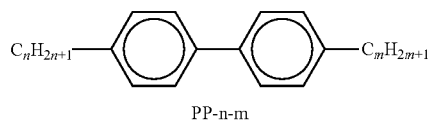
PP-n-m
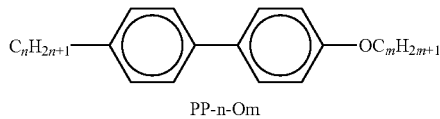
PP-n-Om
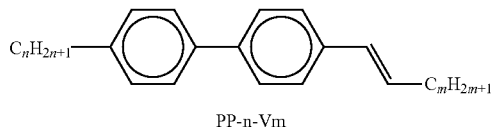
PP-n-Vm
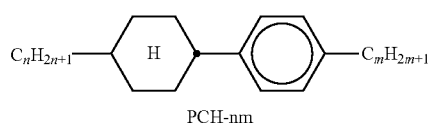
PCH-nm
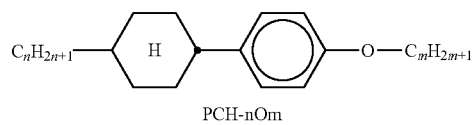
PCH-nOm
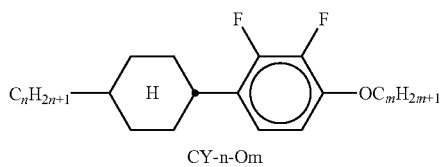
CY-n-Om
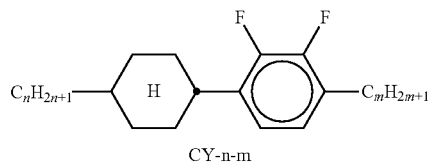
CY-n-m TABLE A-continued
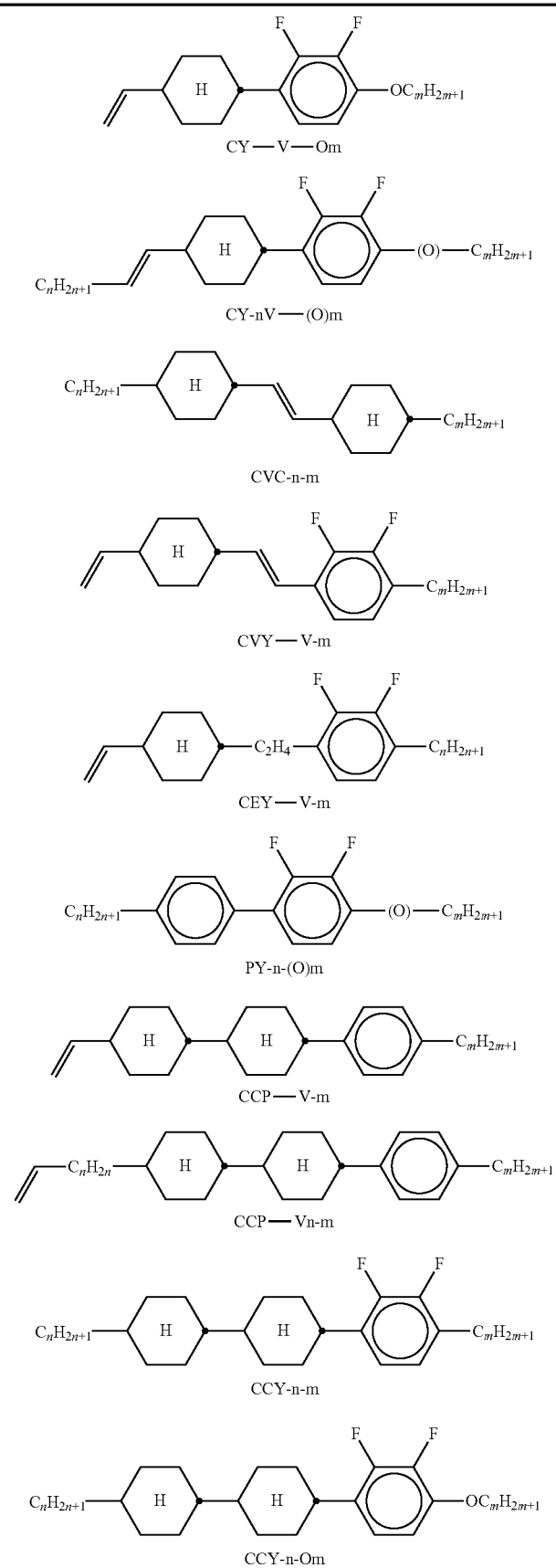

TABLE A-continued
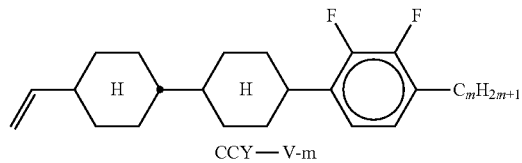
CCY—V-m
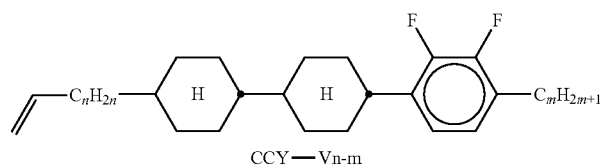
CCY—Vn-m
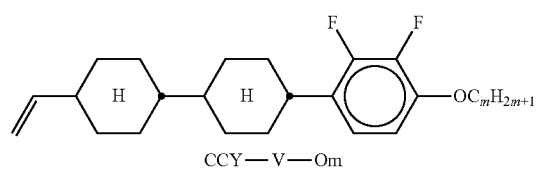
CCY—V—Om
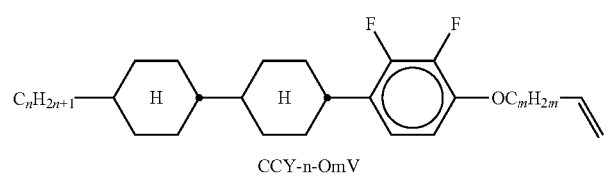
CCY-n-OmV
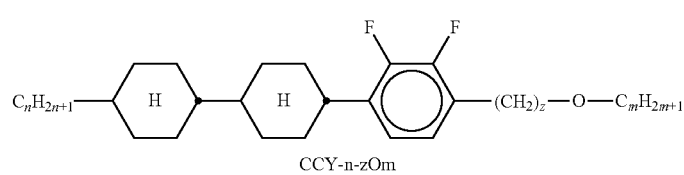
CCY-n-zOm
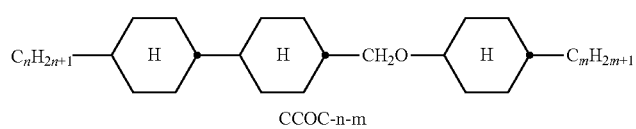
CCOC-n-m
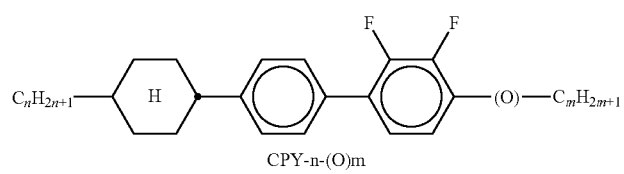
CPY-n-(O)m
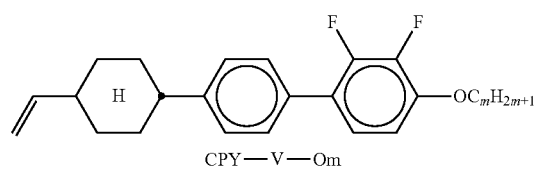
CPY—V—Om
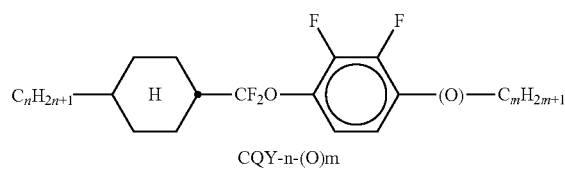
CQY-n-(O)m TABLE A-continued
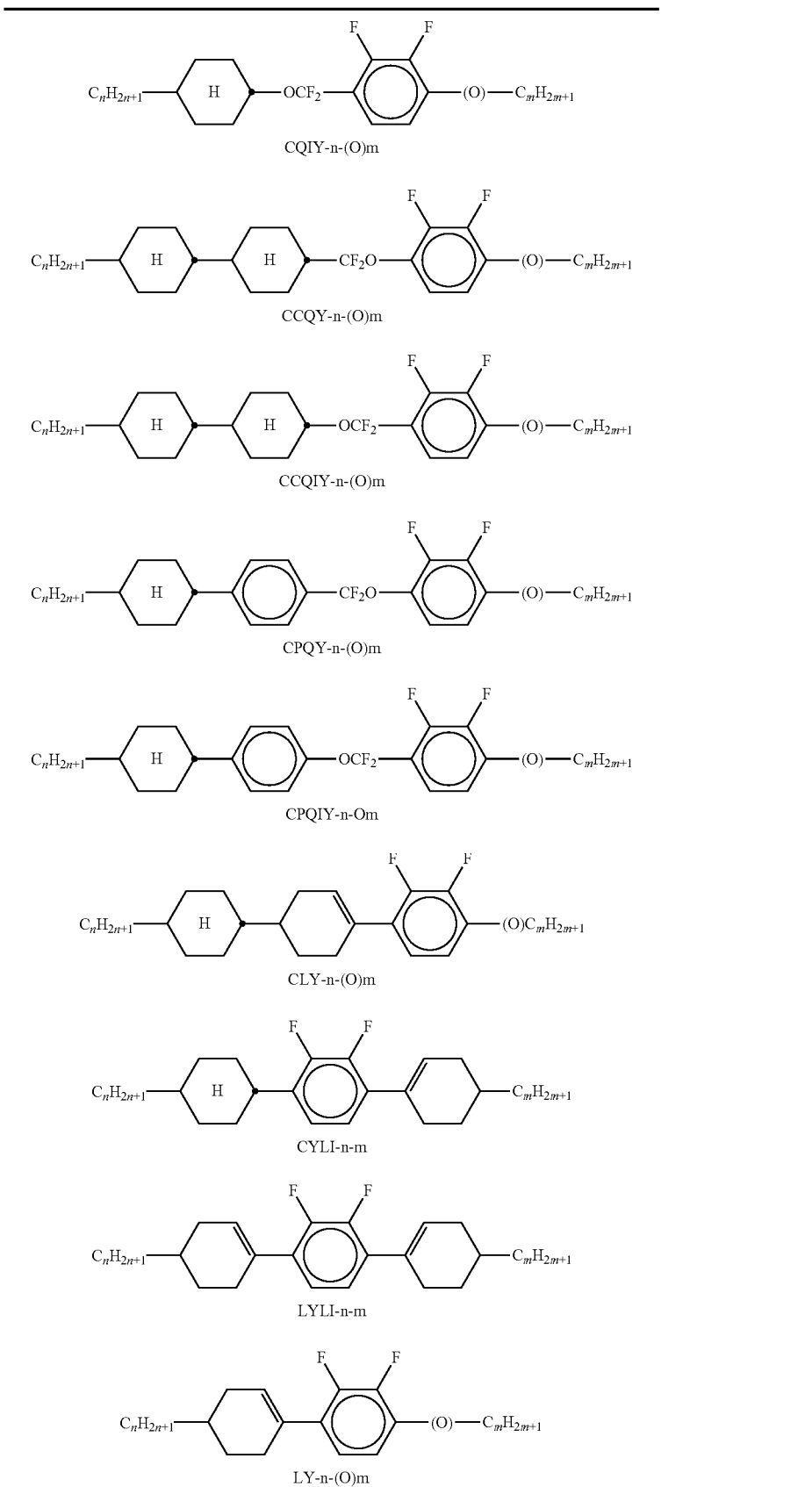

TABLE A-continued
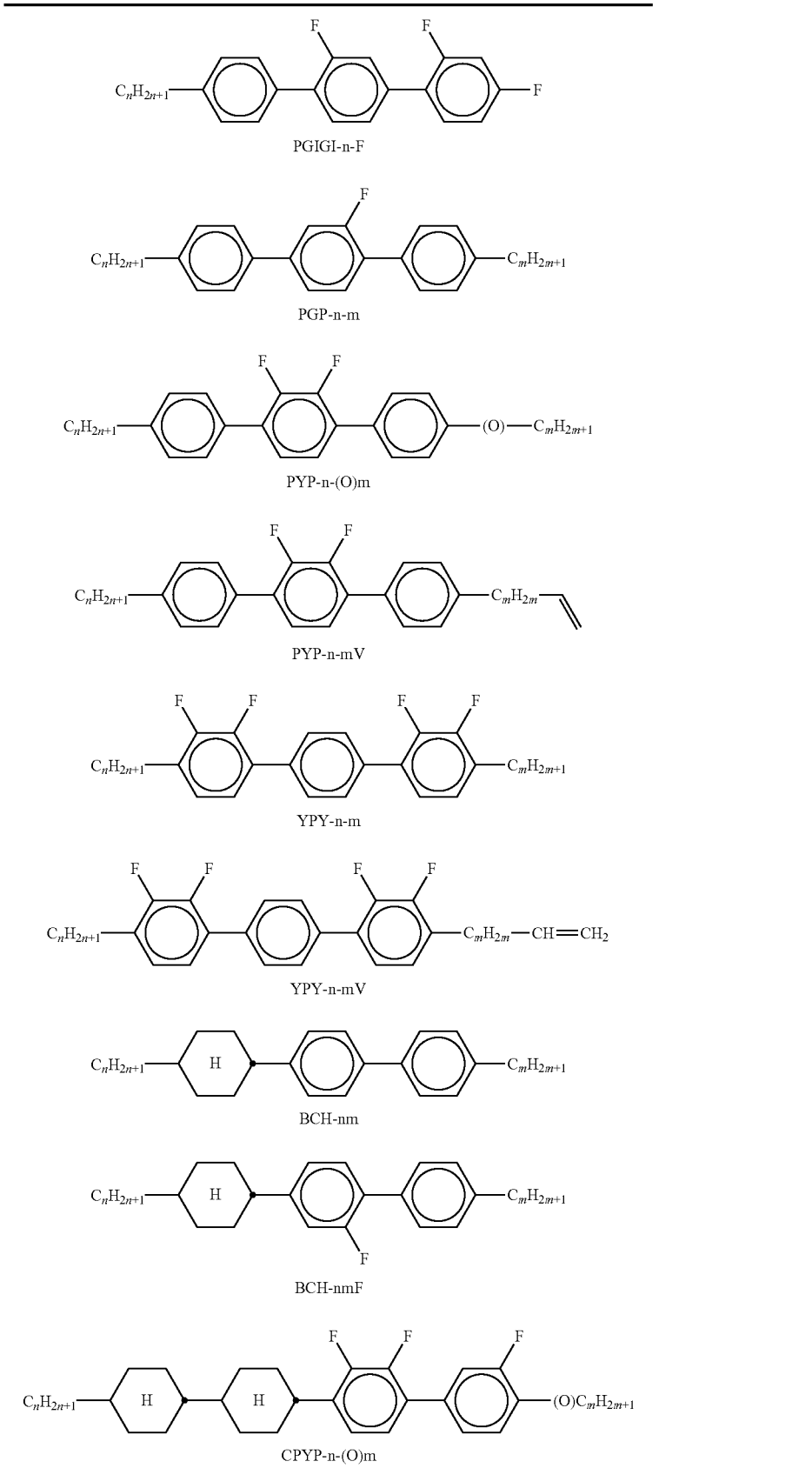

TABLE A-continued
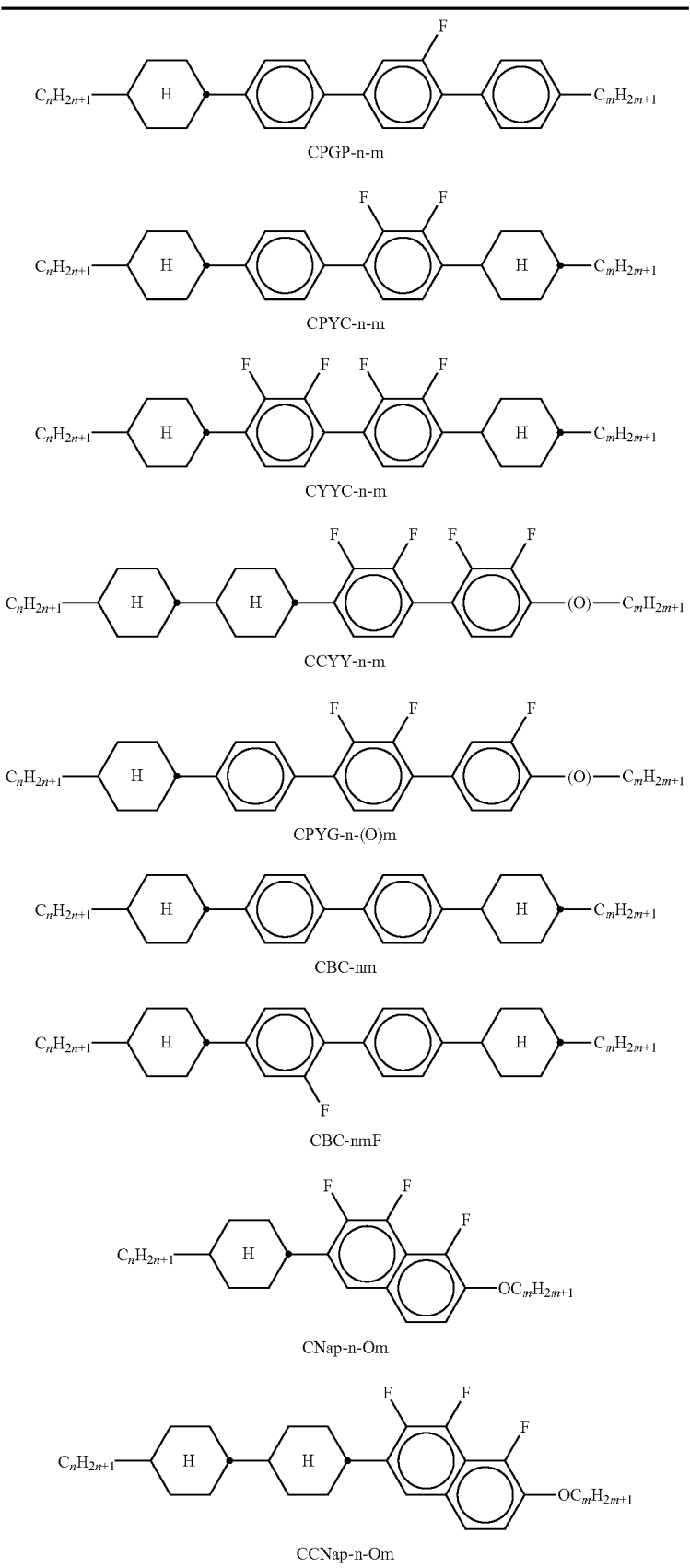

TABLE A-continued

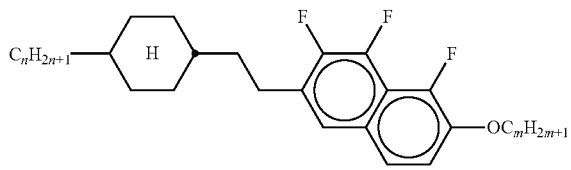
CENap-n-Om

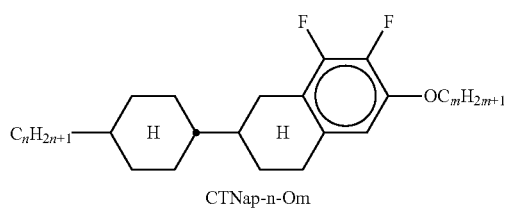
CTNap-n-Om

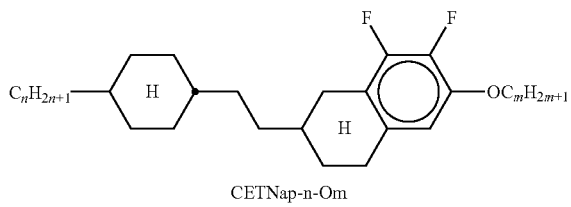
CETNap-n-Om

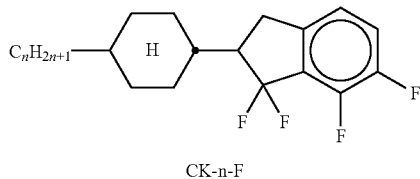
CK-n-F

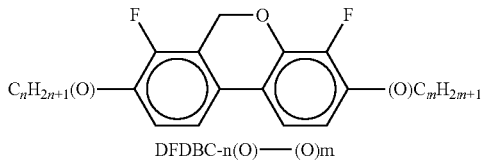
DFDBC-n(O)—(O)m

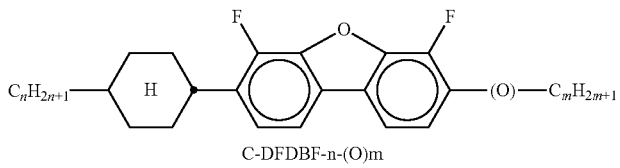
C-DFDBF-n-(O)m

In a preferred embodiment of the present invention, the LC media according to the invention comprise one or more compounds selected from the group consisting of compounds from Table A.

Table B shows possible chiral dopants which can be added to the LC media according to the invention.

TABLE B

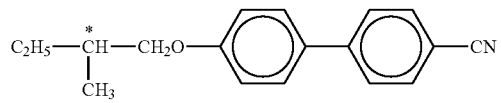
C 15

TABLE B-continued
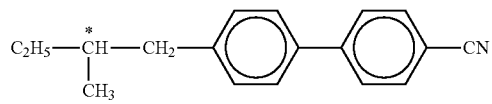
CB 15
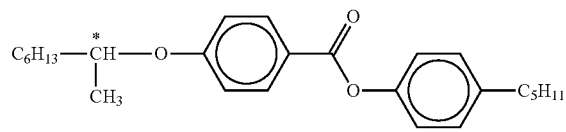
CM 21
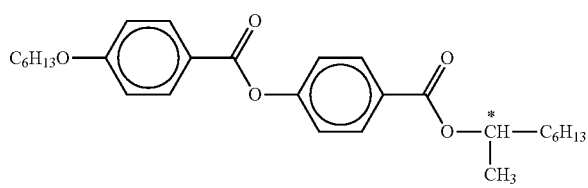
R/S-811
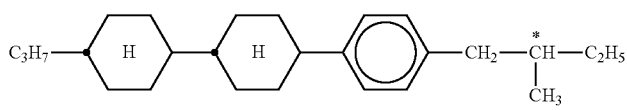
CM 44
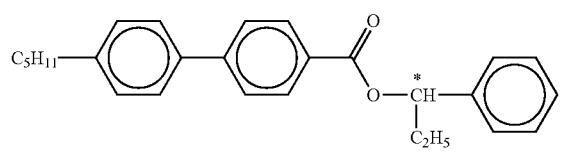
CM 45
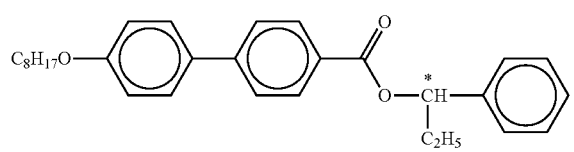
CM 47
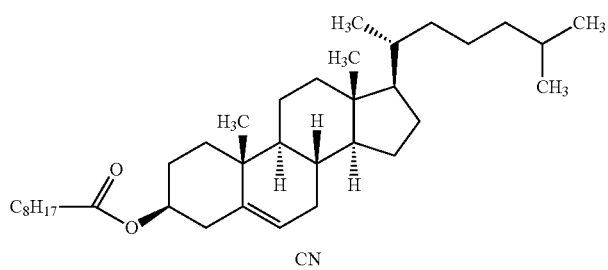
CN
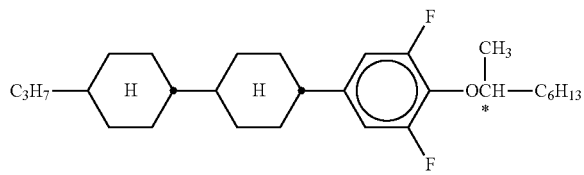
R/S-2011

TABLE B-continued

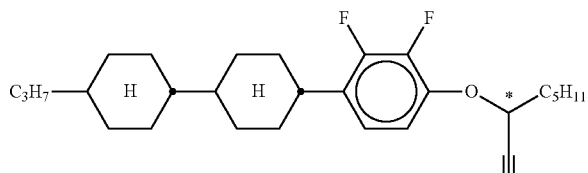

R/S-3011

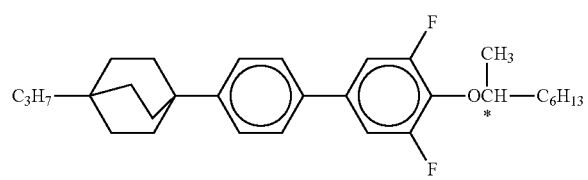

R/S-4011

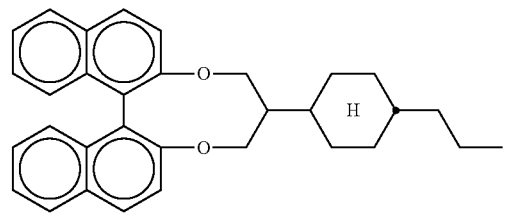

R/S-5011

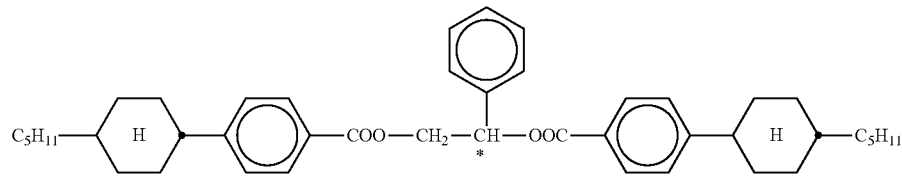

R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

Table C shows possible stabilisers which can be added to the LC media according to the invention.

(n here denotes an integer from 1 to 12, preferably 1, 2, 3, 4, 5, 6, 7 or 8, terminal methyl groups are not shown).

TABLE C

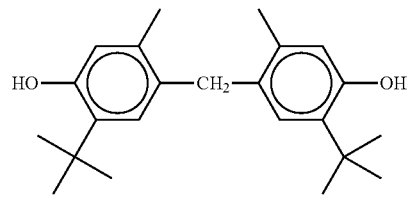

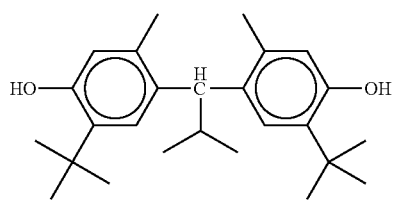

TABLE C-continued
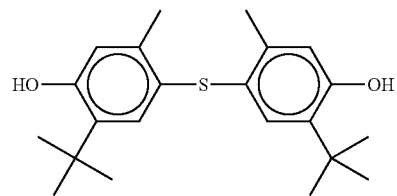
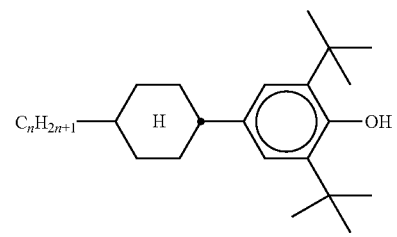
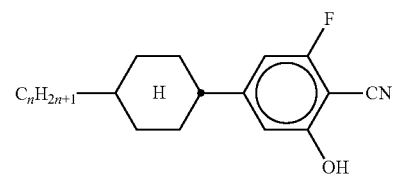
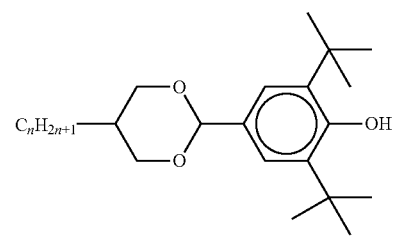
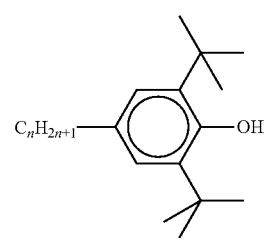
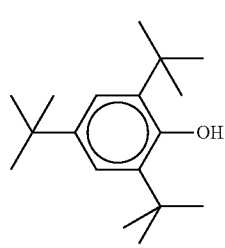
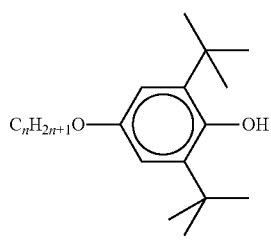

TABLE C-continued
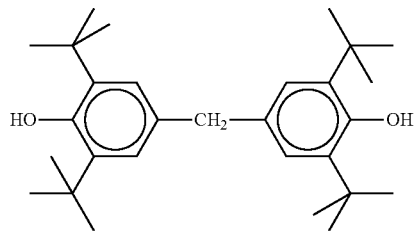
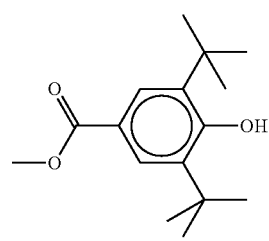
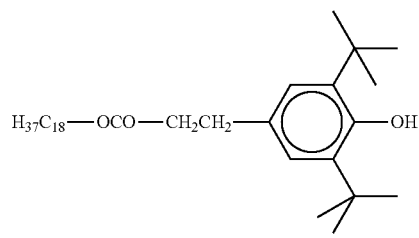
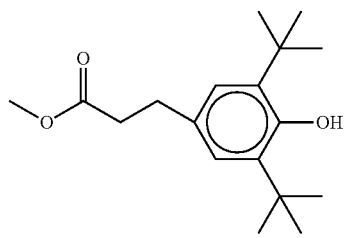
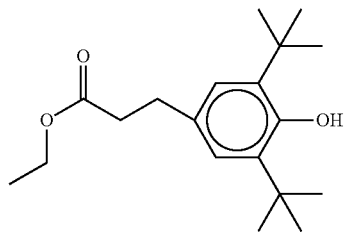
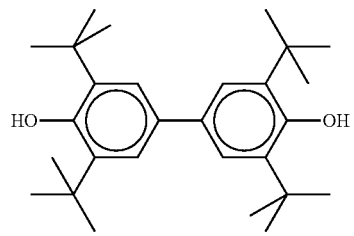

TABLE C-continued
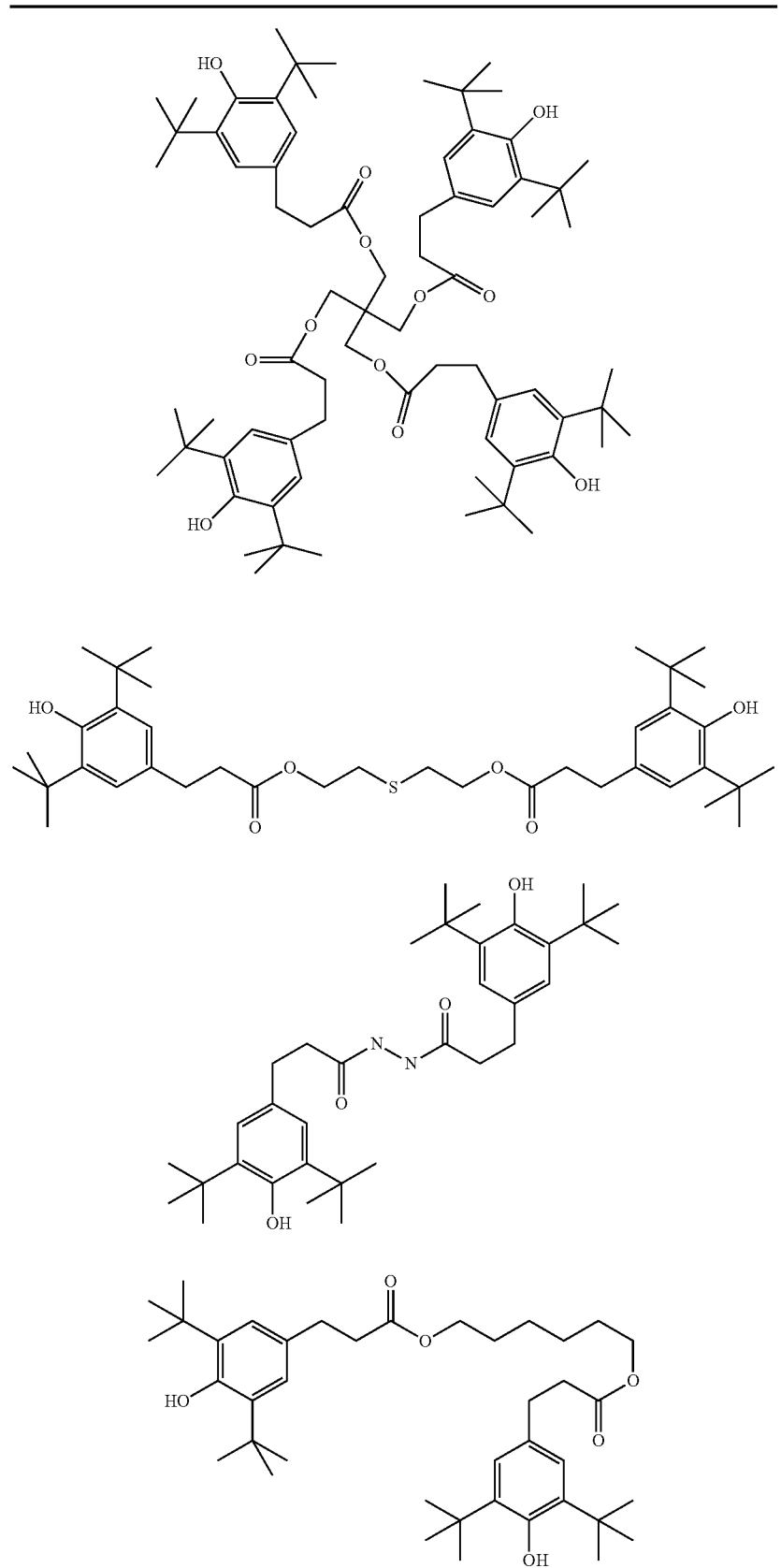

TABLE C-continued
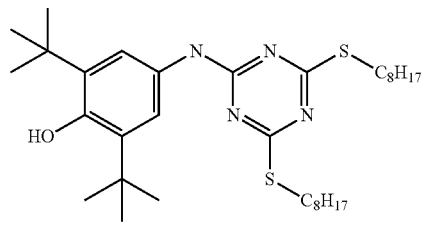
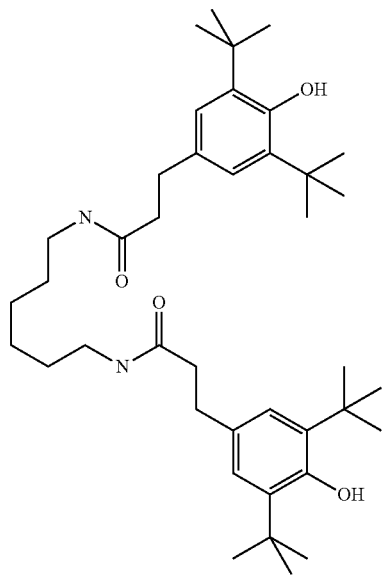 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
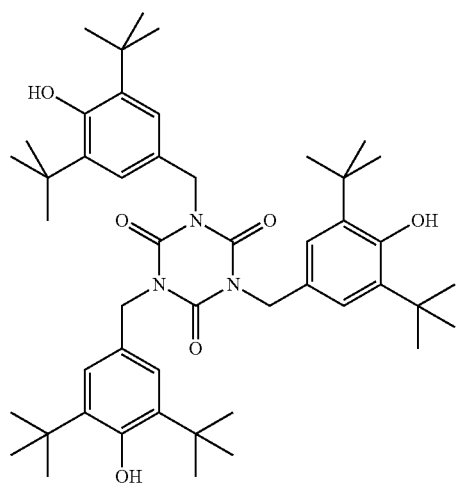 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
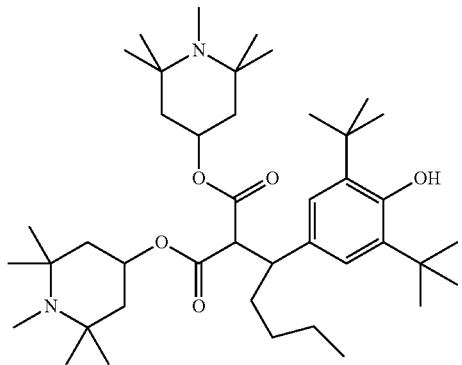 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
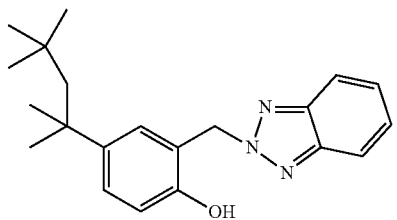 [SMILES: CC(C)(C)CC(C)(C)c1ccc(O)c(Cn2nc3ccccc3n2)c1]
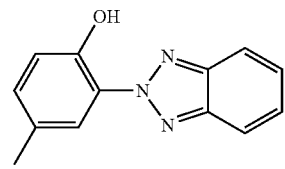 [SMILES: Cc1ccc(O)c(-n2nc3ccccc3n2)c1]
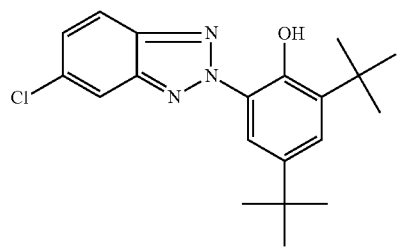 [SMILES: CC(C)(C)c1cc(-n2nc3ccc(Cl)cc3n2)c(O)c(C(C)(C)C)c1]
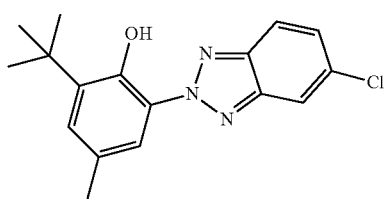 [SMILES: Cc1cc(-n2nc3ccc(Cl)cc3n2)c(O)c(C(C)(C)C)c1]
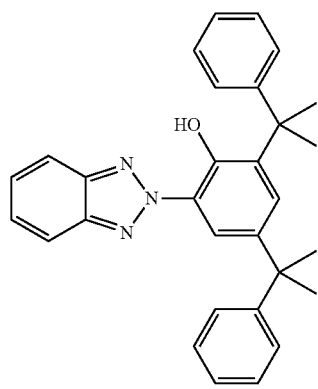 [SMILES: CC(C)(c1ccccc1)c1cc(-n2nc3ccccc3n2)c(O)c(C(C)(C)c2ccccc2)c1]
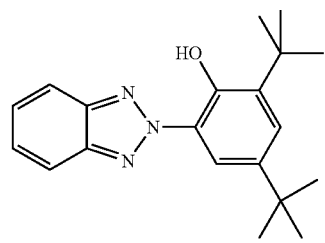 [SMILES: CC(C)(C)c1cc(-n2nc3ccccc3n2)c(O)c(C(C)(C)C)c1]

TABLE C-continued
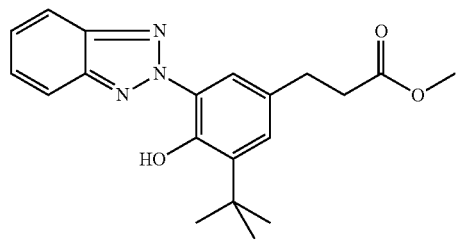 [SMILES: COC(=O)CCc1cc(-n2nc3ccccc3n2)c(O)c(C(C)(C)C)c1]
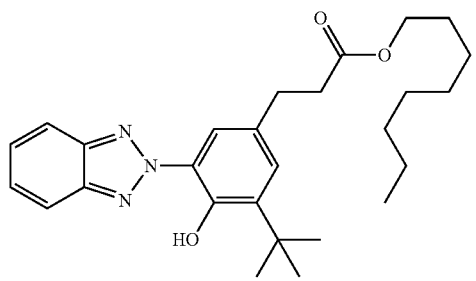 [SMILES: CCCCCCCCOC(=O)CCc1cc(-n2nc3ccccc3n2)c(O)c(C(C)(C)C)c1]
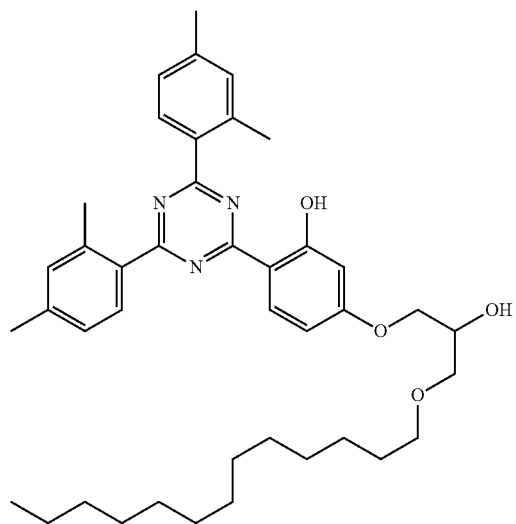 [SMILES: CCCCCCCCCCCCCOCC(O)COc1ccc(-c2nc(-c3ccc(C)cc3C)nc(-c3ccc(C)cc3C)n2)c(O)c1]
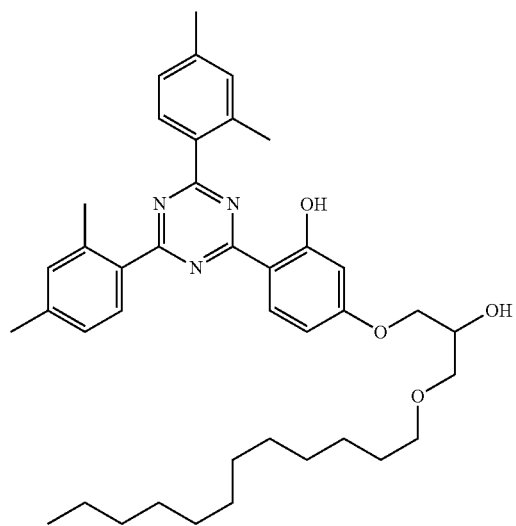 [SMILES: CCCCCCCCCCCCOCC(O)COc1ccc(-c2nc(-c3ccc(C)cc3C)nc(-c3ccc(C)cc3C)n2)c(O)c1]

TABLE C-continued

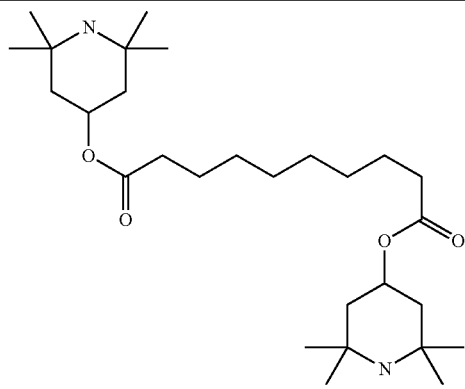

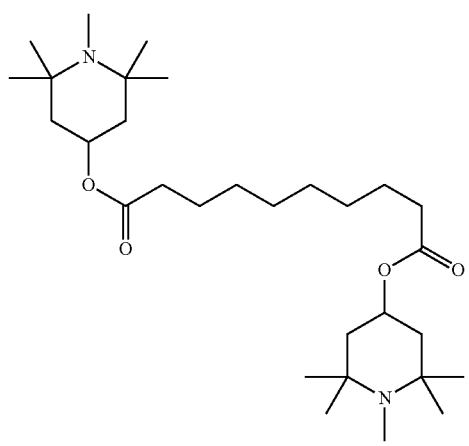

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

Table D shows illustrative compounds which can be used in the LC media in accordance with the present invention, preferably as reactive mesogenic compounds.

TABLE D

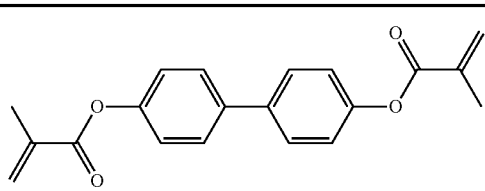
RM-1

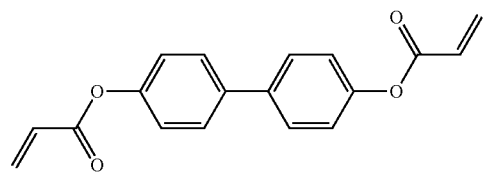 [SMILES: C=CC(=O)Oc1ccc(-c2ccc(OC(=O)C=C)cc2)cc1]
RM-2

TABLE D-continued
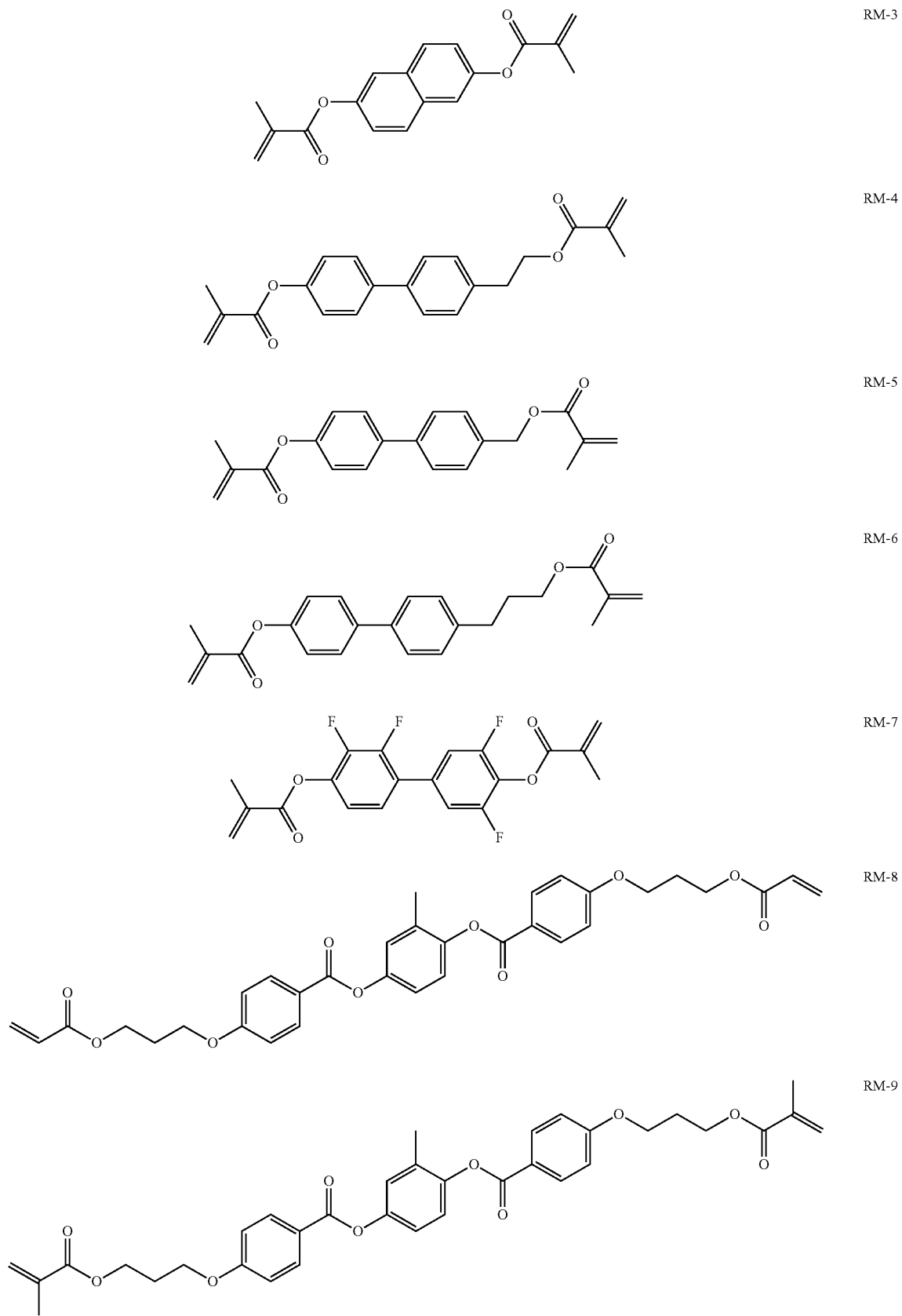

TABLE D-continued
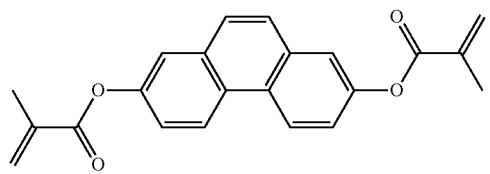 RM-10
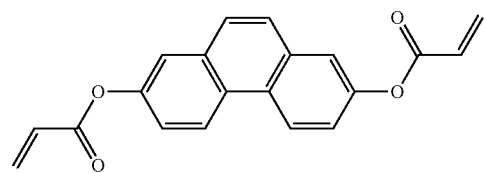 [SMILES: C=C(C)C(=O)Oc1ccc2c(ccc3cc(OC(=O)C(=C)C)ccc32)c1] RM-11
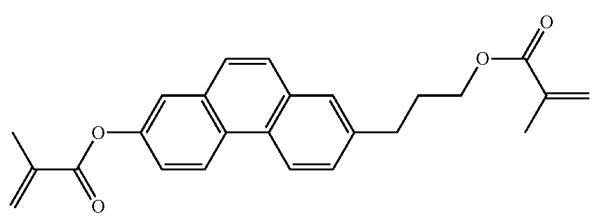 [SMILES: C=C(C)C(=O)OCCCc1ccc2c(ccc3cc(OC(=O)C(=C)C)ccc32)c1] RM-12
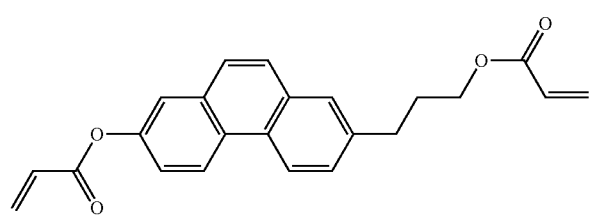 [SMILES: C=CC(=O)OCCCc1ccc2c(ccc3cc(OC(=O)C=C)ccc32)c1] RM-13
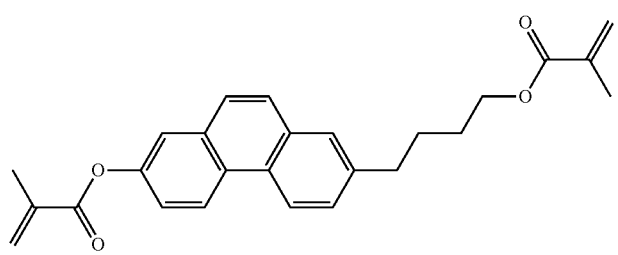 [SMILES: C=C(C)C(=O)OCCCCc1ccc2c(ccc3cc(OC(=O)C(=C)C)ccc32)c1] RM-14
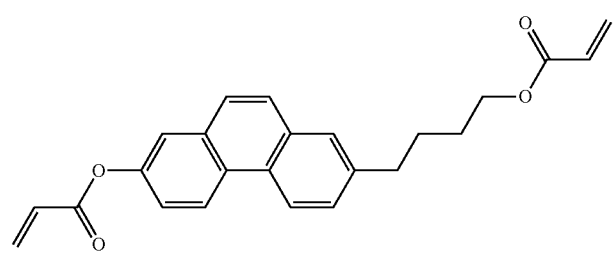 [SMILES: C=CC(=O)OCCCCc1ccc2c(ccc3cc(OC(=O)C=C)ccc32)c1] RM-15
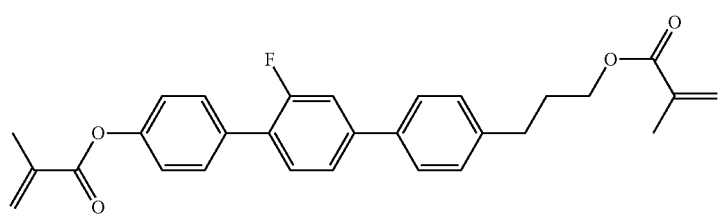 [SMILES: C=C(C)C(=O)OCCCc1ccc(-c2ccc(-c3ccc(OC(=O)C(=C)C)cc3)c(F)c2)cc1] RM-16

TABLE D-continued
| | |
|---|---|
| 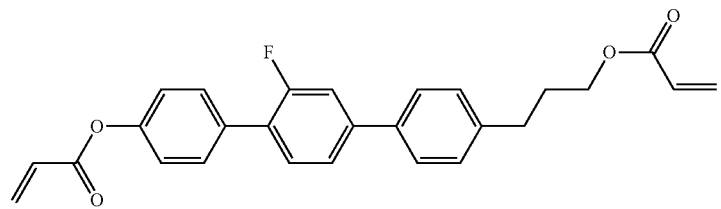 [SMILES: C=CC(=O)OCCCc1ccc(-c2ccc(-c3ccc(OC(=O)C=C)cc3)c(F)c2)cc1] | RM-17 |
| 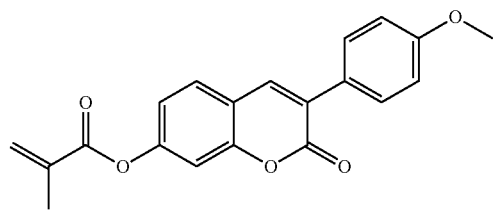 [SMILES: C=C(C)C(=O)Oc1ccc2cc(-c3ccc(OC)cc3)c(=O)oc2c1] | RM-18 |
| 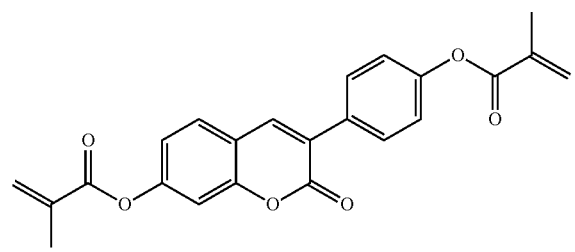 [SMILES: C=C(C)C(=O)Oc1ccc(-c2cc3ccc(OC(=O)C(=C)C)cc3oc2=O)cc1] | RM-19 |
| 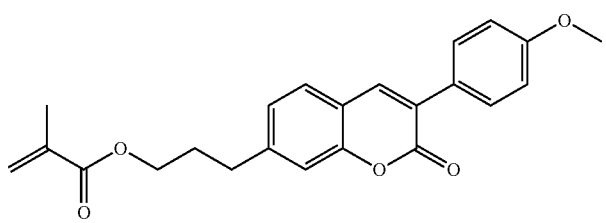 [SMILES: C=C(C)C(=O)OCCCc1ccc2cc(-c3ccc(OC)cc3)c(=O)oc2c1] | RM-20 |
| 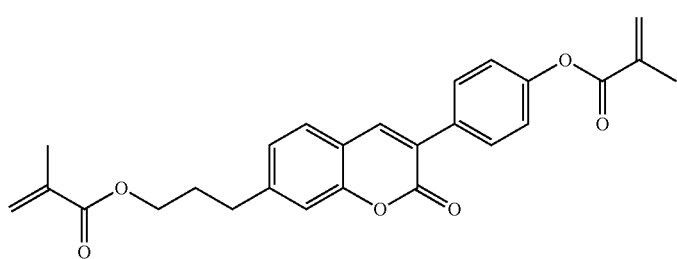 [SMILES: C=C(C)C(=O)OCCCc1ccc2cc(-c3ccc(OC(=O)C(=C)C)cc3)c(=O)oc2c1] | RM-21 |
| 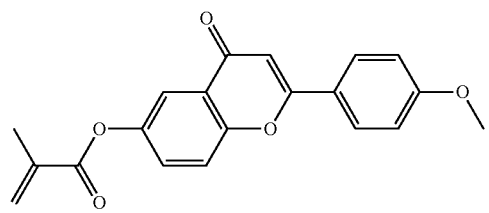 [SMILES: C=C(C)C(=O)Oc1ccc2oc(-c3ccc(OC)cc3)cc(=O)c2c1] | RM-22 |
| 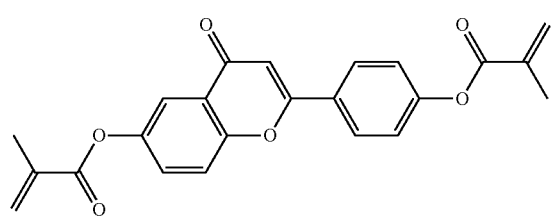 [SMILES: C=C(C)C(=O)Oc1ccc(-c2cc(=O)c3cc(OC(=O)C(=C)C)ccc3o2)cc1] | RM-23 |

In a preferred embodiment of the present invention, the mesogenic media comprise one or more compounds selected from the group of the compounds from Table D.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon_\perp$ dielectric permittivity perpendicular to the director at 20° C. and 1 kHz,
$\epsilon_\parallel$ dielectric permittivity parallel to the director at 20° C. and 1 kHz,
$\Delta\epsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\epsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

The display used for measurement of the capacitive threshold voltage consists of two plane-parallel glass outer plates at a separation of 20 µm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 µm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light (usually 365 nm) of defined intensity for a pre-specified time, with a voltage simultaneously being applied to the display (usually 10 V to 30 V alternating current, 1 kHz). In the examples, unless indicated otherwise, a 50 mW/cm² mercury vapour lamp is used, and the intensity is measured using a standard UV meter (model Ushio UNI meter) fitted with a 365 nm band-pass filter.

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into TN-VHR test cells (rubbed at 90°, TN-polyimide alignment layer, layer thickness d≈6 µm). The HR value is determined after 5 min at 100° C. before and after UV exposure for 2 h (suntest) at 1 V, 60 Hz, 64 µs pulse (measuring instrument: Autronic-Melchers VHRM-105).

In order to investigate the low-temperature stability, also referred to as "LTS", i.e. the stability of the LC mixture to individual components spontaneously crystallising out at low temperatures, bottles containing 1 g of LC/RM mixture are placed in storage at −10° C., and it is regularly checked whether the mixtures have crystallised out.

EXAMPLE 1

The nematic LC mixture N1 is formulated as follows:

| | | | |
|---|---|---|---|
| CCH-501 | 9.00% | Cl.p. | +70.0 |
| CCH-35 | 14.00% | $\Delta n$ | 0.0825 |
| PCH-53 | 8.00% | $\Delta\epsilon$ | −3.5 |
| CY-3-O4 | 14.00% | $\epsilon_\parallel$ | 3.5 |
| CY-5-O4 | 13.00% | $K_3/K_1$ | 1.00 |
| CCY-3-O2 | 8.00% | $\gamma$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

The following polymerisable compounds are tested:

formula 1A1

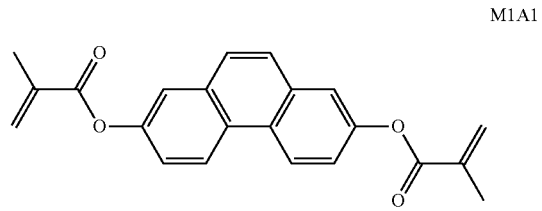

M1A1 formula 1B1

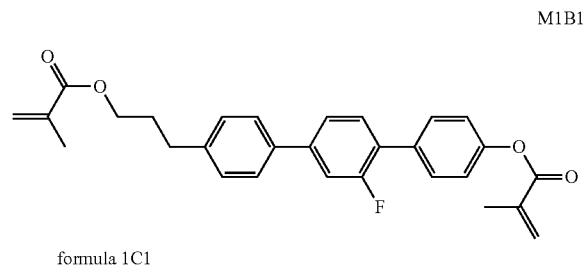

M1B1 formula 1C1

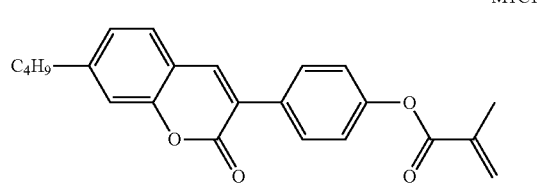

M1C1

-continued formula 1C2

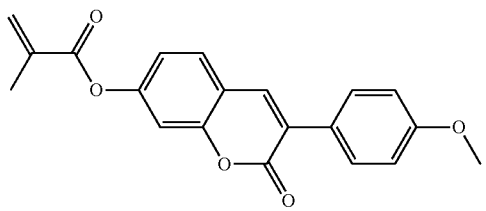

M1C2 formula 2A1

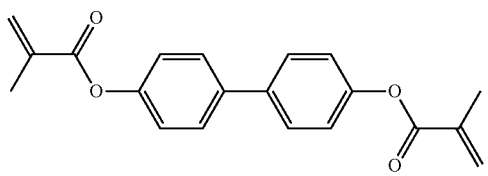

M2A1

Polymerisable monomeric compounds of the formulae shown above are added to LC mixture N1 in the amounts and combinations indicated in each case, and the resultant mixtures are introduced into VA e/o test cells (alkali-free glass, rubbed antiparallel, VA-polyimide alignment layer, layer thickness d≈4 µm). The cells are irradiated with UV light having an intensity of 100 mW/cm$^2$ for the stated time with application of a voltage of 24 V (alternating current), causing polymerisation of the monomeric compound. The tilt angle is determined by crystal rotation experiment (Autronic-Melchers TBA-105) before and after the UV irradiation.

The comparative tilt-angle results are shown in Table 1.

TABLE 1

| | | (t = exposure time) | | |
|---|---|---|---|---|
| t/s | 0.3% M2A1 | 0.25% M2A1 + 0.05% M1A1 | 0.25% M2A1 + 0.05% M1B1 | 0.25% M2A1 + 0.05% M1C1 |
| | | Tilt angle/° | | |
| 0 | 88.3 | 88.3 | 88.2 | 88.2 |
| 120 | 83.4 | 77.7 | 78.9 | 80.2 |
| 240 | 76.3 | 71.0 | 72.6 | 75.8 |
| 360 | 74.8 | 70.3 | 72.2 | 75.1 |

In order to determine the polymerisation rate, the residual content of unpolymerised RM (in % by weight) in the test cells is measured by the HPLC method after various exposure times. To this end, each mixture is polymerised in the test cell under the conditions indicated. The mixture is then rinsed out of the test cell using MEK (methyl ethyl ketone) and measured.

The RM concentrations after various exposure times are shown in Table 2.

TABLE 2

| | | (t = exposure time) | | |
|---|---|---|---|---|
| t/s | 0.3% M2A1 | 0.25% M2A1 + 0.05% M1A1 | 0.25% M2A1 + 0.05% M1B1 | 0.25% M2A1 + 0.05% M1C1 |
| | | RM concentration/% | | |
| 0 | 0.300 | 0.300 | 0.300 | 0.300 |
| 120 | 0.251 | 0.180 | 0.175 | 0.154 |

TABLE 2-continued

| | | (t = exposure time) | | |
|---|---|---|---|---|
| t/s | 0.3% M2A1 | 0.25% M2A1 + 0.05% M1A1 | 0.25% M2A1 + 0.05% M1B1 | 0.25% M2A1 + 0.05% M1C1 |
| | | RM concentration/% | | |
| 240 | 0.140 | 0.078 | 0.108 | 0.108 |
| 360 | 0.080 | 0.054 | 0.051 | 0.051 |

The VHR value is measured as follows: one or more polymerisable monomeric compounds are added to LC host mixture N1 in the amounts respectively indicated, and the resultant mixture is introduced into VHR test cells (VA-polyimide alignment layer, homeotropic alignment). The VHR value is determined after a waiting time of 5 min at 100° C. before and after corresponding exposure at 1 V, 60 Hz, 64 µs pulse (measuring instrument: Autronic-Melchers VHRM-105). For comparative purposes, a measurement is carried out with the pure LC mixture N1 (i.e. without addition of monomers).

The respective VHR values are shown in Table 3.

TABLE 3

| Condition | N1 without monomers | 0.3% M2A1 in N1 | 0.3% M1A1 in N1 | 0.3% M1B1 in N1 |
|---|---|---|---|---|
| | | VHR/% | | |
| initial | 98.5 | 98.2 | 98.6 | 98.2 |
| 2 h suntest | 97.8 | 97.9 | 97.7 | 97.2 |
| 2 min UVA | 98.4 | 97.9 | 97.5 | 96.7 |
| 15 min UVA | 97.4 | 97.6 | 97.3 | 96.2 |
| 2 min UVA + 2 h suntest | 96.5 | 97.7 | 97.7 | 97.0 |
| 15 min UVA + 2 h suntest | 95.7 | 97.6 | 97.5 | 95.1 |

| Condition | 0.3% M1C1 in N1 | 0.25% M2A1 + 0.05% M1A1 in N1 | 0.25% M2A1 + 0.05% M1B1 in N1 | 0.25% M2A1 + 0.05% M1C1 in N1 |
|---|---|---|---|---|
| | | VHR/% | | |
| initial | 98.0 | 98.6 | 98.4 | 98.3 |
| 2 h suntest | 93.5 | 97.8 | 98.1 | 97.6 |
| 2 min UVA | 92.3 | 98.0 | 97.9 | 97.6 |
| 15 min UVA | 89.6 | 97.2 | 97.8 | 97.3 |
| 2 min UVA + 2 h suntest | 94.7 | 97.7 | 97.8 | 97.7 |
| 15 min UVA + 2 h suntest | 90.7 | 97.6 | 97.7 | 97.4 |

The experiments described above are carried out analogously for the polymerisable monomeric compound M1C2 of the formula 1C2 shown above. Differences from the experimental conditions described above are indicated in the respective table.

The comparative tilt-angle results are shown in Table 4.

TABLE 4

| | (t = exposure time), intensity 50 mW/cm$^2$ | |
|---|---|---|
| t/s | 0.3% M2A1 | 0.25% M2A1 + 0.05% M1C2 |
| | Tilt angle/° | |
| 0 | 89.2 | 89.6 |
| 30 | 89.1 | 88.5 |

TABLE 4-continued (t = exposure time), intensity 50 mW/cm$^2$

| t/s | 0.3% M2A1 | 0.25% M2A1 + 0.05% M1C2 |
|---|---|---|
| | Tilt angle/° | |
| 60 | 88.4 | 85.7 |
| 120 | 83.9 | 81.5 |
| 240 | 76.5 | 77.9 |
| 360 | — | 75.3 |

The RM concentrations after various exposure times are shown in Table 5.

TABLE 5

(t = exposure time), intensity 50 mW/cm$^2$, test cells made from soda-lime glass

| t/s | 0.3% M2A1 | 0.25% M2A1 + 0.05% M1C2 |
|---|---|---|
| | RM concentration/% | |
| 0 | 0.300 | 0.300 |
| 120 | 0.268 | 0.181 |
| 240 | 0.226 | 0.134 |
| 360 | 0.176 | 0.116 |

The respective VHR values are shown in Table 6.

TABLE 6

Test cells with TN polyimide, planar alignment

| Condition | N1 without monomers | 0.3% M2A1 in N1 | 0.3% M1C2 in N1 | 0.25% M2A1 + 0.05% M1C2 in N1 |
|---|---|---|---|---|
| | | VHR/% | | |
| initial | 93.8 | 91.6 | 91.8 | 92.9 |
| 2 h suntest | 89.3 | 92.2 | 86.9 | 92.0 |

It can be seen from Tables 1, 2, 4 and 5 that the commencement of polymerisation and the tilt-angle generation are accelerated by addition of a first polymerisable compound (M1A1-M1C1) to the second polymerisable compound (M2A1). This behaviour of the first polymerisable compound corresponds to that of a typical photoinitiator. The resultant advantages are faster establishment of the desired tilt angle and faster polymerisation, i.e. a lower residual RM content, in the later display.

In addition, it can be seen from Tables 3 and 6 that, in addition, very good VHR values can be achieved, even after very long UV exposures, on use of a combination of a first polymerisable compound (M1A1-M1C1) and a second polymerisable compound (M2A1). This is not possible on use of a respective single polymerisable compound If fast polymerisation is desired. The polymerisable compounds 1C1 and 1C2 each exhibit, for example, a relatively low VHR after UV exposure. The combination of this polymerisable compound with a second polymerisable compound M2A1 results, however, in a very good VHR after UV exposure.

The polymerisation and tilt-angle generation thus proceed more quickly in an LC mixture comprising a combination of two polymerisable compounds than in an LC mixture which comprises only the polymerisable compound M2A1. In addition, a very good VHR value can also be achieved in addition to a faster reaction rate.

The invention claimed is:

1. Polymerisable mixture comprising at least one first polymerisable compound and at least one second polymerisable compound, where the first polymerisable compound initiates and/or accelerates the polymerisation of the second polymerisable compound, wherein the first polymerisable compound is selected from the group consisting of the following formulae:

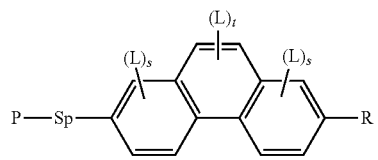

1A

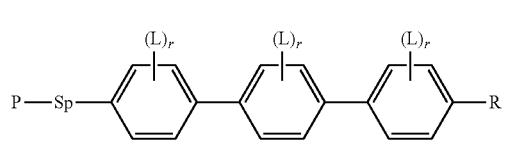

1B

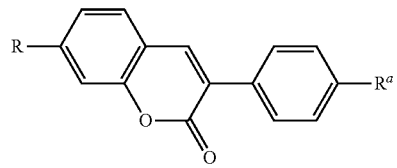

1C

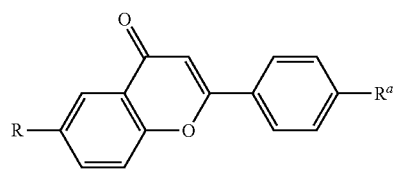

1D wherein

L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, r denotes 0, 1, 2, 3 or 4, s denotes 0, 1, 2 or 3, t denotes 0, 1 or 2, P on each occurrence, identically or differently, denotes a polymerisable radical selected from the group consisting of:

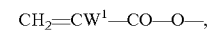

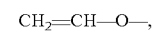

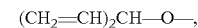

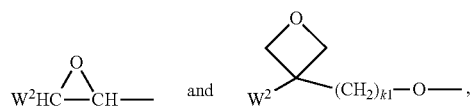

in which

W$^1$ denotes H, F, Cl, CN, CF$_3$, phenyl or alkyl having 1 to 5 C atoms, $W^2$ denotes H or alkyl having 1 to 5 C atoms, and
k1 denotes 0 or 1,
Sp on each occurrence, identically or differently, denotes a spacer group or a single bond,
R, $R^a$ each denote P-Sp; and
wherein the second polymerisable compound contains a ring system which is different from the first polymerisable compound, containing one or more carbo- or heterocyclic radicals and two or more than two polymerisable radicals, which are connected to the ring system directly or via a spacer group and
wherein the polymerisable radicals are selected from the group consisting of:

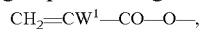

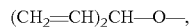

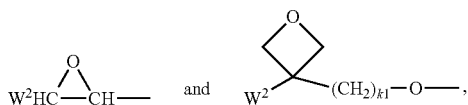

in which
$W^1$ denotes H, F, Cl, CN, $CF_3$, phenyl or alkyl having 1 to 5 C atoms,
$W^2$ denotes H or alkyl having 1 to 5 C atoms, and
k1 denotes 0 or 1.

2. Polymerisable mixture according to claim 1, characterised in that the second polymerisable compound is selected from the group consisting of the following formulae:

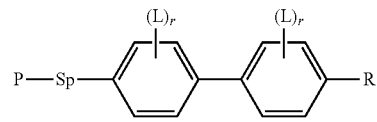
2A

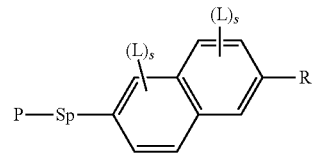
2B

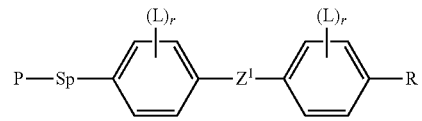
2C

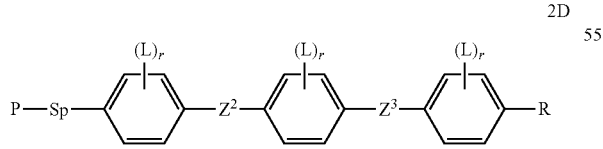
2D

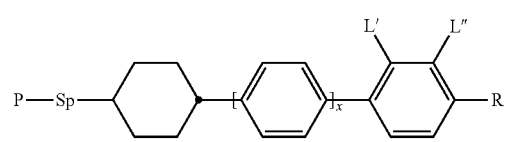
2E in which P, Sp, R, L and r have the meanings indicated in claim 1,
$Z^1$ denotes —O—, —CO—, —CO—O—, —O—CO—, —C($R^y R^z$)— or —$CF_2CF_2$—,
$R^y$ and $R^z$ each, independently of one another, denote H, F, $CH_3$ or $CF_3$,
$Z^2$ and $Z^3$ each, independently of one another, denote —CO—O—, —O—CO—, —$CH_2$O—, —O$CH_2$—, —$CF_2$O—, —O$CF_2$—, or —$(CH_2)_n$—, where n is 2, 3 or 4,
L' and L" each, independently of one another, denote H, F or Cl, and
x denotes 0 or 1.

3. A LC medium comprising a polymerisable mixture according to claim 1.

4. A LC medium, comprising
a polymerisable component A) comprising the polymerisable mixture according to claim 1, and
a liquid-crystalline component B) comprising one or more low-molecular-weight compounds.

5. A LC medium comprising a polymer which is obtainable by polymerisation of a polymerisable mixture according to claim 1, and one or more additional compounds other than the first polymerisable compound and second polymerisable compound of said polymerisable mixture according to claim 1.

6. A LC medium comprising a polymerisable mixture comprising at least one first polymerisable compound and at least one second polymerisable compound, where the first polymerisable compound initiates and/or accelerates the polymerisation of the second polymerisable compound,
wherein the first polymerisable compound contains a ring system containing a divalent radical and two or more than two polymerisable radicals, which are connected to the ring system directly or via a spacer group, and the second polymerisable compound contains a ring system which is different from the first polymerisable compound, containing one or more carbo- or heterocyclic radicals and two or more than two polymerisable radicals, which are connected to the ring system directly or via a spacer group and
wherein the polymerisable radicals are selected from the group consisting of:

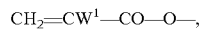

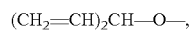

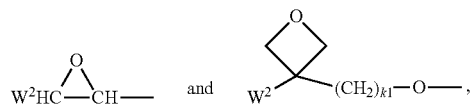

in which
$W^1$ denotes H, F, Cl, CN, $CF_3$, phenyl or alkyl having 1 to 5 C atoms,
$W^2$ denotes H or alkyl having 1 to 5 C atoms, and
k1 denotes 0 or 1 and
wherein the first polymerisable compound contains a divalent radical selected from the group consisting of the formulae A, B, C and D:

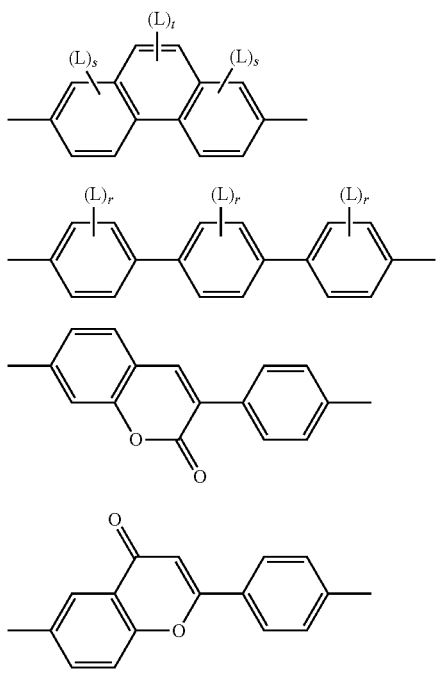

in which the individual radicals have the following meanings:
L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms,
r denotes 0, 1, 2, 3 or 4,
s denotes 0, 1, 2 or 3, and
t denotes 0, 1 or 2, which
additionally comprises one or more compounds of the formulae CY and/or PY:

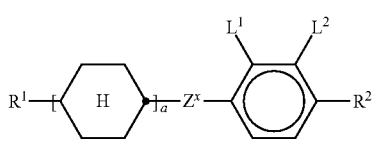   CY

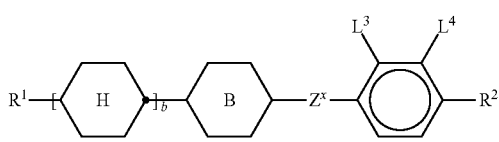   PY in which the individual radicals have the following meanings:
a denotes 1 or 2,
b denotes 0 or 1,

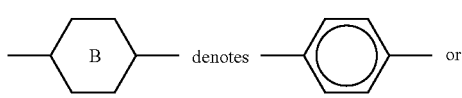   denotes

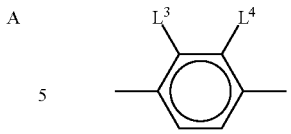

$R^1$ and $R^2$ each, independently of one another, denote alkyl having 1 to 12 C atoms, where, in addition, one or two non-adjacent $CH_2$ groups may be replaced by —O—, —CH=CH—, —CO—, —O—CO— or —CO—O— in such a way that O atoms are not linked directly to one another,
$Z^x$ denotes —CH=CH—, —$CH_2O$—, —$OCH_2$—, —$CF_2O$—, —$OCF_2$—, —O—, —$CH_2$—, —$CH_2CH_2$— or a single bond,
$L^{1-4}$ each, independently of one another, denote F, Cl, $OCF_3$, $CF_3$, $CH_3$, $CH_2F$, $CHF_2$.

7. A LC medium according to claim 3, characterised in that it additionally comprises one or more compounds of the following formula:

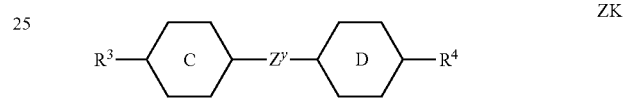   ZK in which the individual radicals have the following meanings:

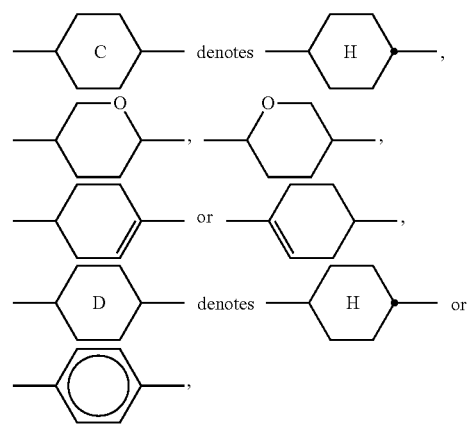

$R^3$ and $R^4$ each, independently of one another, denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another,
$Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF— or a single bond.

8. A LC display of the PS or PSA type comprising a polymerisable mixture comprising at least one first polymerisable compound and at least one second polymerisable compound, where the first polymerisable compound initiates and/or accelerates the polymerisation of the second polymerisable compound,
wherein the first polymerisable compound contains a ring system containing a divalent radical and two or more than two polymerisable radicals, which are connected to the ring system directly or via a spacer group, and the second polymerisable compound contains a ring system which is different from the first polymerisable compound, containing one or more carbo- or heterocyclic radicals and two or more than two polymerisable radicals, which are connected to the ring system directly or via a spacer group and wherein the polymerisable radicals are selected from the group consisting of:

$CH_2=CW^1-CO-O-$, $CH_2=CH-O-$, $(CH_2=CH)_2CH-O-CO-$, $(CH_2=CH)_2CH-O-$,

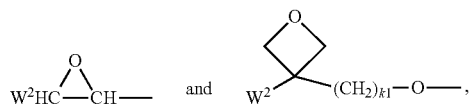

in which
W$^1$ denotes H, F, Cl, CN, CF$_3$, phenyl or alkyl having 1 to 5 C atoms,
W$^2$ denotes H or alkyl having 1 to 5 C atoms, and
k1 denotes 0 or 1 and
wherein the first polymerisable compound contains a divalent radical selected from the group consisting of the formulae A, B, C and D:

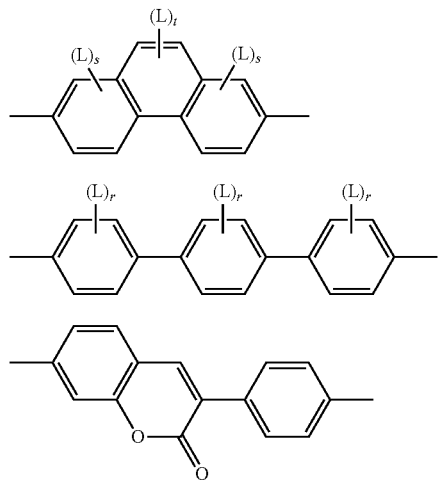

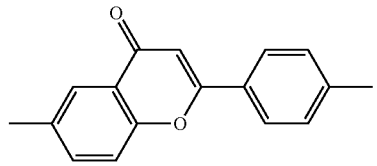

in which the individual radicals have the following meanings:
L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms,
r denotes 0, 1, 2, 3 or 4,
s denotes 0, 1, 2 or 3, and
t denotes 0, 1 or 2.

9. A LC display containing an LC medium according to claim 5.

10. A LC display according to claim 8, characterised in that the LC display comprises an LC cell having two substrates and two electrodes, where at least one substrate is transparent to light and at least one substrate has one or two electrodes, and a layer, located between the substrates, of said LC medium as defined in claim 8 where the polymer obtainable by polymerisation of the polymerisable mixture is obtained between the substrates of the LC cell in the LC medium.

11. A LC display according to claim 8, characterised in that it is a PSA-VA, PSA-OCB, PSA-positive-VA, PSA-IPS, PSA-FFS or PSA-TN display.

12. A process for the production of an LC display of the PS or PSA type in which an LC medium according to claim 8 is introduced into an LC cell having two substrates and two electrodes, where at least one substrate is transparent to light and at least one substrate has one or two electrodes, and the polymerisable mixture is polymerised.

13. Polymerisable mixture according to claim 1, wherein P is a vinyloxy, acrylate, methacrylate, fluoroacrylate, chloroacrylate, oxetane-O— or epoxide group.

14. Polymerisable mixture according to claim 1, wherein Sp, when being different from a single bond, denotes —(CH$_2$)$_{P1}$—, —(CH$_2$)$_{P1}$—O—, —(CH$_2$)$_{P1}$—O—CO— or —(CH$_2$)$_{P1}$—O—CO—O—, in which P1 denotes an integer from 1 to 12, where these groups are linked to P in such a way that O atoms are not directly adjacent.

15. Polymerisable mixture according to claim 14 wherein P1 denotes an integer from 1 to 6.

16. Polymerisable mixture according to claim 14 wherein P1 denotes an integer which is 1, 2 or 3.

17. A LC display containing an LC medium according to claim 6.

* * * * *